United States Patent
Simon

(10) Patent No.: US 12,462,272 B2
(45) Date of Patent: *Nov. 4, 2025

(54) SYSTEM AND METHOD FOR RECEIVING REAL-TIME CONSUMER TRANSACTIONAL FEEDBACK

(71) Applicant: MBP Insights, Inc., Singapore (SG)

(72) Inventor: James J. Simon, Singapore (SG)

(73) Assignee: MBP INSIGHTS, INC., Singapore (SG)

( * ) Notice: Subject to any disclaimer, the term of this patent is extended or adjusted under 35 U.S.C. 154(b) by 718 days.

This patent is subject to a terminal disclaimer.

(21) Appl. No.: 17/403,411

(22) Filed: Aug. 16, 2021

(65) Prior Publication Data

US 2021/0374786 A1 Dec. 2, 2021

Related U.S. Application Data

(63) Continuation-in-part of application No. 17/222,417, filed on Apr. 5, 2021, now abandoned, which is a
(Continued)

(51) Int. Cl.
*G06Q 30/00* (2023.01)
*G06Q 20/36* (2012.01)
(Continued)

(52) U.S. Cl.
CPC ....... *G06Q 30/0217* (2013.01); *G06Q 20/363* (2013.01); *G06Q 30/0215* (2013.01); *G06Q 30/0224* (2013.01); *G06Q 30/0234* (2013.01)

(58) Field of Classification Search
CPC ............. G06Q 30/0217; G06Q 20/363; G06Q 30/0215; G06Q 30/0224; G06Q 30/0234;
(Continued)

(56) References Cited

U.S. PATENT DOCUMENTS 8,775,243 B2 * 7/2014 Gillenson .......... G06Q 30/0216
705/14.1
10,032,182 B1 * 7/2018 Lee .................... G06Q 30/0207
(Continued)

FOREIGN PATENT DOCUMENTS

JP 2004178213 A 6/2004
JP 2008083756 A 4/2008
(Continued)

OTHER PUBLICATIONS

Pei-Yu Chen, Yen-Chun Chou and R. J. Kauffman, "Community-Based Recommender Systems: Analyzing Business Models from a Systems Operator's Perspective," 2009 42nd Hawaii International Conference on System Sciences, 2009, pp. 1-10, doi: 10.1109/HICSS.2009.117. (Year: 2009) (Year: 2009).*

(Continued)

*Primary Examiner* — Sun M Li
(74) *Attorney, Agent, or Firm* — Dickinson Wright PLLC; Stephen A. Mason; Andrea L. Arndt

(57) ABSTRACT

Systems, methods, and storage media for operating a wireless device are disclosed. Exemplary implementations may: receive information pertaining to a trigger event, wherein the trigger event relates to a transaction associated with a consumer and the transaction comprises an identifier associated with the consumer; based on the trigger event: generate a survey comprising one or more requests for information related to the transaction, select an incentive offer from an incentive offer database, transmit, for display on a wireless device of the consumer, a notification to the wireless device, wherein the notification comprises the survey and information pertaining to the incentive offer; receive one or more responses to the survey; and responsive to receiving the one or more responses, store the incentive offer in a digital wallet associated with the identifier.

26 Claims, 19 Drawing Sheets

Related U.S. Application Data continuation of application No. 16/559,291, filed on Sep. 3, 2019, now Pat. No. 10,970,732.

(60) Provisional application No. 62/870,558, filed on Jul. 3, 2019, provisional application No. 62/861,921, filed on Jun. 14, 2019.

(51) Int. Cl.
*G06Q 30/0207* (2023.01)
*G06Q 30/0217* (2023.01)
*G06Q 30/0234* (2023.01)

(58) Field of Classification Search
CPC . G06Q 20/387; G06Q 30/0203; G06Q 20/322
See application file for complete search history.

(56) References Cited

U.S. PATENT DOCUMENTS

| | | | |
|---|---|---|---|
| 10,467,557 B1 | 11/2019 | Kodesh et al. | |
| 2004/0249712 A1 | 12/2004 | Brown et al. | |
| 2006/0053058 A1 | 3/2006 | Hotchkiss et al. | |
| 2007/0236509 A1 | 10/2007 | Eldridge et al. | |
| 2008/0208688 A1* | 8/2008 | Byerley | G06Q 30/0239 |
| | | | 705/14.39 |
| 2009/0104888 A1 | 4/2009 | Cox | |
| 2009/0327067 A1* | 12/2009 | Berger | G06Q 30/02 |
| | | | 705/14.1 |
| 2011/0320246 A1 | 12/2011 | Tietzen et al. | |
| 2012/0158477 A1 | 6/2012 | Tennenholtz et al. | |
| 2012/0166261 A1 | 6/2012 | Velusamy et al. | |
| 2013/0048710 A1* | 2/2013 | Marsico | G06F 16/9554 |
| | | | 235/375 |
| 2013/0132220 A1 | 5/2013 | Baum | |
| 2013/0144690 A1* | 6/2013 | White | G06Q 30/0222 |
| | | | 705/14.1 |
| 2013/0191197 A1 | 7/2013 | Hamrick et al. | |
| 2013/0282458 A1 | 10/2013 | Roberts et al. | |
| 2013/0311337 A1 | 11/2013 | Stoll et al. | |
| 2014/0040161 A1 | 2/2014 | Berlin | |
| 2014/0278857 A1* | 9/2014 | Bergman | G06Q 30/0211 |
| | | | 705/14.13 |
| 2014/0297380 A1 | 10/2014 | Wenger et al. | |
| 2014/0351033 A1 | 11/2014 | Azevado | |
| 2015/0134439 A1* | 5/2015 | Maxwell | G06Q 30/0207 |
| | | | 705/14.1 |
| 2015/0235307 A1* | 8/2015 | Webb | G06Q 30/0203 |
| | | | 705/7.32 |
| 2015/0254698 A1 | 9/2015 | Bondesen et al. | |
| 2015/0302457 A1 | 10/2015 | Azebedo | |
| 2015/0371247 A1* | 12/2015 | Kruglick | G06Q 30/0203 |
| | | | 705/7.32 |
| 2016/0042342 A1 | 2/2016 | Proctor, Jr. et al. | |
| 2016/0180365 A1 | 6/2016 | Shi | |
| 2017/0192648 A1* | 7/2017 | Abedin | G06Q 10/06393 |
| 2019/0156358 A1 | 5/2019 | Pace | |
| 2020/0074495 A1* | 3/2020 | Unnerstall | G06Q 30/0238 |

FOREIGN PATENT DOCUMENTS

| | | |
|---|---|---|
| JP | 2017027579 A | 2/2017 |
| WO | 2001053922 A2 | 7/2001 |
| WO | WO-2014098794 A1 * | 6/2014 ......... G06Q 30/0207 |
| WO | 2014190333 A1 | 11/2014 |
| WO | 2015187558 A1 | 12/2015 |

OTHER PUBLICATIONS

D. Calado and M. L. Pardal, "Tamper-Proof Incentive Scheme for Mobile Crowdsensing Systems," 2018 IEEE 17th International Symposium on Network Computing and Applications (NCA), Cambridge, MA, USA, 2018, pp. 1-8, doi: 10.1109/NCA.2018.8548093 (Year: 2018).*
D. Calado and M. L. Pardal, "Tamper-Proof Incentive Scheme for Mobile Crowdsensing Systems," 2018 IEEE 17th International Symposium on Network Computing and Applications (NCA), Cambridge, MA, USA, 2018, pp. 1-8, doi: 10.1109/NCA.2018.8548093 . (Year: 2018) (Year: 2018).*
S. Brack, S. Dietzel and B. Scheuermann, "ANONUS: Anonymous Bonus Point System with Fraud Detection," 2017 IEEE 42nd Conference on Local Computer Networks (LCN), Singapore, 2017, pp. 356-364, doi: 10.1109/LCN.2017.50. (Year: 2017).*
The International Searching Authority, Search Report and Written Opinion for International Application No. PCT/US20/52534, mailed Jan. 7, 2021, eight pages.
The International Searching Authority, Search Report and Written Opinion for International Application No. PCT/US20/45028, mailed Oct. 21, 2020, six pages.
The International Searching Authority, Search Report and Written Opinion for International Application No. PCT/US20/36678, mailed Sep. 25, 2020, seven pages.
The International Searching Authority, Search Report and Written Opinion for International Application No. PCT/US20/40707, mailed Aug. 3, 2020, 11 pages.
International Preliminary Report on Patentability & Written Opinion for International Application No. PCT/US2020/036678, Mailing Date Sep. 25, 2020, Date of Completion Aug. 6, 2020, All together 5 Pages.
International Preliminary Report on Patentability & Written Opinion for International Application No. PCT/US2020/040707, Mailing Date Aug. 3, 2020, Date of Completion Jul. 22, 2020, All together 9 Pages.
International Preliminary Report on Patentability & Written Opinion for International Application No. PCT/US2020/045028, Date of Issuance of this report Feb. 8, 2022, All together 4 Pages.
Chen et al. "Community-Based Recommender Systems: Analyzing Business Models From a System Operator's Perspective", Proceedings of the 42nd Hawaii International Conference on System Sciences—2009, 10 Pages.
Ji et al., "Extraction of Comparative Opinionate Sentences from Product Online Reviews," 2015 12th International Conference on Fuzzy Systems and Knowledge Discovery (FSKD), 2015, pp. 1777-1785.
He et al., "Extracting the Comparative Relations for Mobile Reviews," 2012, pp. 3247-3250.
Salah et al., "A Blockchain-based System for Online Consumer Reviews," IEEE Infocom 2019—IEEE Conference on Computer Communications Workshops (INFOCOM WKSHPS), 2019, pp. 853-858.
Teubner et al., "Social Identity and Reciprocity in Online Gift Giving Networks," 46th Hawaii International Conference on System Sciences, 2013, pp. 708-717.

* cited by examiner

SYSTEM AND METHOD FOR RECEIVING REAL-TIME CONSUMER TRANSACTIONAL FEEDBACK

CROSS-REFERENCE TO RELATED APPLICATIONS

This application is a continuation-in-part of and claims priority to U.S. application Ser. No. 17/222,417, filed Apr. 5, 2021, titled "System and Method for Receiving Real-Time Consumer Transactional Feedback", which is a continuation of and claims priority to U.S. patent application Ser. No. 16/559,291, filed Sep. 3, 2019, titled "System and Method for Receiving Real-Time Consumer Transactional Feedback", which claims priority to both 1) U.S. Provisional Patent Application No. 62/861,921, filed Jun. 14, 2019 and titled "System and Method for Receiving Real-Time Consumer Transactional Feedback", and 2) U.S. Provisional Patent Application No. 62/870,558, filed Jul. 3, 2019 and titled "System and Method for Receiving Real-Time Consumer Transactional Feedback". All applications are hereby incorporated by reference in their entirety for all purposes.

TECHNICAL FIELD

This disclosure relates generally to technological improvements in the fields of electronic collection and analytics of customer satisfaction data. More specifically, the disclosure describes systems and methods for improving response rates and quality of responses to consumer surveys, in particular by incentivizing rapid responses via a consumer's mobile device.

BACKGROUND

Many online and brick-and-mortar merchants, retailers, and service providers rely on consumer feedback in order to help them make business decisions. For example, a merchant may seek information about which products are popular with the consumer and which are not, and why. A retailer or service provider may be able to improve customer service perceptions in a dramatic way by spotting recurring problems or complaints in customer surveys. Some retailers may be interested in understanding similarities and differences in expectations and experiences between a consumer's experiences in a physical store versus in an online transaction. Such feedback, when gathered accurately and quickly, can help a business run more efficiently and profitably.

Conventional methods of surveying customers and collecting customer feedback do not provide high-quality information for a variety of reasons. For example, retailers often request customer feedback at the register or via a paper store receipt. In-person requests for feedback tend to discourage criticism and candid suggestions for improvement, while surveys tied to paper store receipts are usually inconvenient to the consumer because they require the consumer to save the receipt and access it later, often to manually log into a web site and/or enter a code number. Many consumers simply do not notice such a request to provide feedback, even when an incentive such as free merchandise or a contest entry is offered.

In many cases, traditional feedback collection methods are overly burdensome to the consumer, resulting in poor, inaccurate or no feedback to the merchant because the process requires several different types of platforms and media—including paper receipts, websites maintained by third-party data aggregators or otherwise separate from the merchant's primary website, unique login or QR codes, etc. Traditional processes typically also require a significant time investment for which the typical consumer is not adequately incentivized to participate. Further, where incentives are offered in traditional processes, there is typically a lack of immediacy in delivery of the reward—a consumer often has to wait for a separate department or entity to contact them by mail, telephone, or email with still further instructions about how to collect a voucher, coupon, or other reward.

Consumers who do find and respond to traditional survey requests are often not representative of the public or the particular business's customer base, often skewing toward disgruntled customers or those who are much more likely, for one reason or another, to read a store receipt. When feedback is given, the business often receives the information long after the purchase, reducing the reliability and insightfulness of the feedback data.

SUMMARY

In general, the present disclosure provides systems and methods for improving response rates and quality of responses to consumer surveys. One aspect of the present disclosure relates to a system configured to select customer feedback questions and associated incentives. The system may include one or more hardware processors configured by machine-readable instructions. The processor(s) may be configured to select a consumer to provide feedback related to one or more transactions associated with the consumer. The processor(s) may be configured to transmit, for display on a wireless device of the consumer, a survey including one or more questions related to the one or more transactions associated with the consumer. The processor(s) may be configured to select an incentive offer from an incentive offer database. The processor(s) may be configured to transmit, for display on the wireless device of the consumer, information related to the incentive offer. The processor(s) may be configured to receive one or more responses to the survey. The processor(s) may be further configured to fulfil the incentive offer.

In some implementations of the system, the selection of the incentive offer may depend at least in part on a geographical location of the mobile device. In some implementations of the system, the selection of the incentive offer may depend at least in part on an identity of a merchant associated with the one or more transactions associated with the consumer. In some implementations of the system, the processor(s) may be configured to transmit, for display on a wireless device of a consumer, a notification that a survey is available to the consumer. Such notification may typically be accomplished by a push notification to an electronic device, by a text message, or email, or by another suitable method of electronic notification. In some implementations of the system, the selection of the consumer may depend at least in part on demographic information or psychographic information associated with the consumer, or on information associated with one or more lifestyle classifications or taxonomies.

In some implementations of the system, the selection of the consumer may depend at least in part on a consumer profile. In some implementations of the system, the consumer profile may be associated with survey preferences defined by a merchant. In some implementations of the system, the incentive offer may be associated with the merchant. In various implementations and throughout this disclosure, the terms "merchant," "retailer," or "service provider" are intended to be expansive and may refer to, as only a few non-limiting examples, a single physical or electronic point-of-sale, a franchise or chain of points of sale, a group of merchants or points of sale that are somehow related to one another by one or more commonalities such as common ownership, geographical proximity, business partnership, etc.

Another aspect of the present disclosure relates to a method for operating a wireless device. The method may include selecting a consumer to provide feedback related to one or more transactions associated with the consumer. The method may include transmitting, for display on a wireless device of the consumer, a survey including one or more questions related to the one or more transactions associated with the consumer. The method may include selecting an incentive offer from an incentive offer database. The method may include transmitting, for display on the wireless device of the consumer, information related to the incentive offer. The method may include receiving one or more responses to the survey. The method may include fulfilling the incentive offer.

Yet another aspect of the present disclosure relates to a non-transient computer-readable storage medium having instructions embodied thereon, the instructions being executable by one or more processors to perform a method for operating a wireless device. The method may include selecting a consumer to provide feedback related to one or more transactions associated with the consumer. The method may include transmitting, for display on a wireless device of the consumer, a survey including one or more questions related to the one or more transactions associated with the consumer. The method may include selecting an incentive offer from an incentive offer database. The method may include transmitting, for display on the wireless device of the consumer, information related to the incentive offer. The method may include receiving one or more responses to the survey. The method may include fulfilling the incentive offer.

Other technical features may be readily apparent to one skilled in the art from the following figures, descriptions, and claims. These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of 'a', 'an', and 'the' include plural referents unless the context clearly dictates otherwise.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, web services (e.g., Representational State Transfer (REST)), or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), solid state drives (SSDs), flash, or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
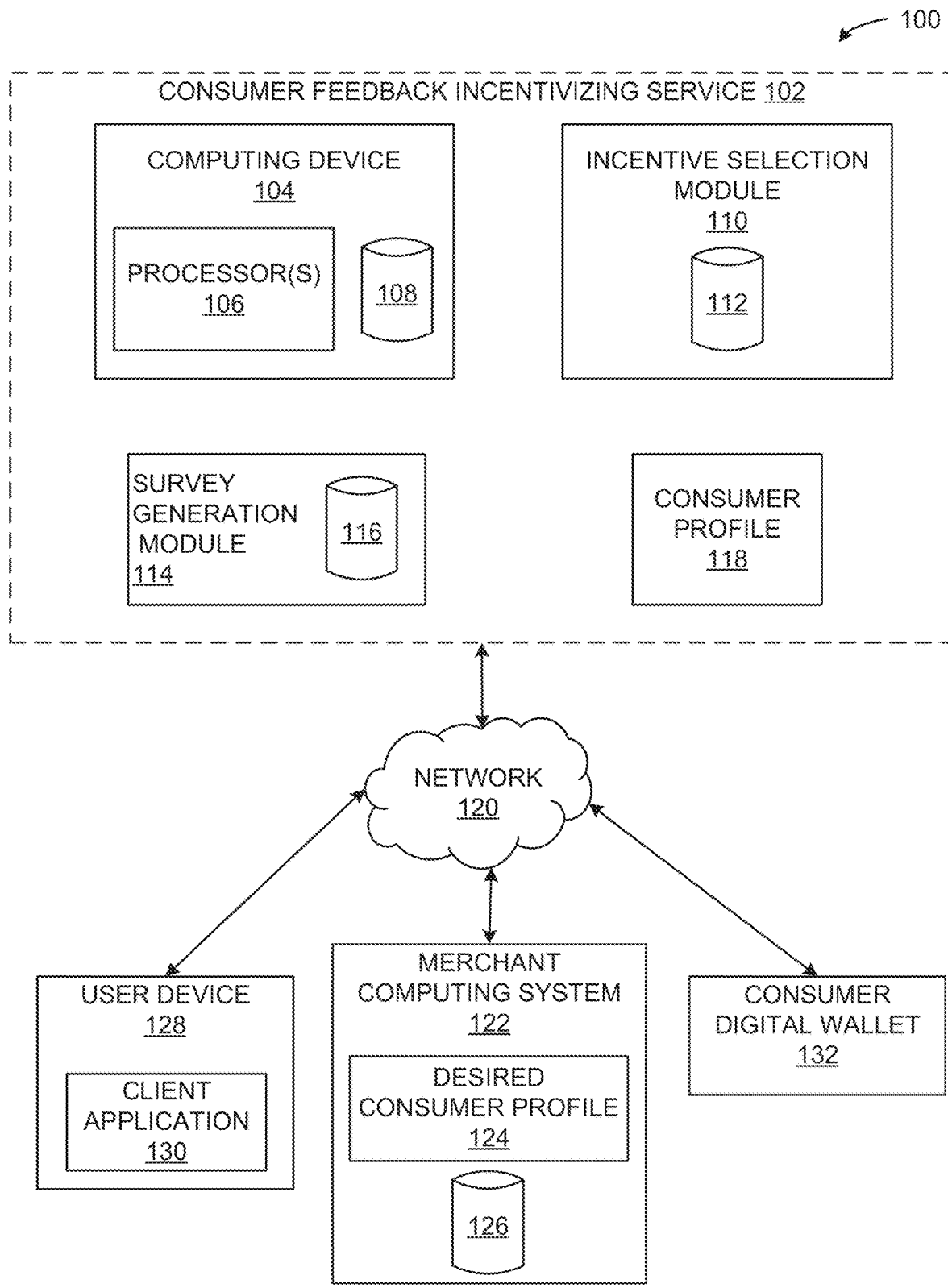
FIG. 1 illustrates a high-level component diagram of an illustrative system architecture, according to some embodiments of this disclosure.

Improvement is desired in the quantity, quality, and timeliness of consumer satisfaction data. By leveraging modern technological hardware to incentivize prompt responses to customer satisfaction surveys, merchants, retailers, and service providers can maximize their efficiency and profits. Conventional methods of surveying customers and collecting customer feedback do not provide high-quality information for a variety of reasons. For example, retailers often request customer feedback at the register or via a paper store receipt. In-person requests for feedback tend to discourage criticism and candid suggestions for improvement, while surveys tied to paper store receipts are usually inconvenient to the consumer because they require the consumer to save the receipt and access it later, often to manually log into a web site and/or enter a code number. Many consumers simply do not notice such a request to provide feedback, even when an incentive such as free merchandise or a contest entry is offered. Consumers who do find and respond to such survey requests are often not representative of the public/broader population or the particular business's customer base, often skewing toward disgruntled customers or those who are much more likely, for one reason or another, to read a store receipt. When feedback is given, the business often receives the information long after the purchase, reducing the reliability and insightfulness of the feedback data.

Aspects of the present disclosure relate to embodiments that overcome the shortcomings described above. The present disclosure relates to systems and methods for incentivizing and receiving real-time, near-time, or batch consumer transactional feedback. In addition to providing systems and methods for incentivizing consumer survey participation and collecting more data and more reliable consumer feedback data promptly, the present disclosure describes evaluating the salience of transaction data, consumer data, and feedback and survey data. With respect to evaluating various types of data and profiles as described in further detail herein, the systems and methods may include consideration of weighted averages, nonparametric ranking methods, Bayesian analyses, Markovian processes and analyses, and other types and methods of statistical and data analysis, as appropriate. In general, references to "data" and related concepts in this disclosure should be understood to refer to plain text data, encrypted or hashed data, data stored or transmitted by any other technologically feasible format not specifically named here, or any combination of formats thereof.

Modern artificial intelligence and machine learning bring exciting new technical, operational and heuristic insights and possibilities to the fields of discussion. It should also be understood that, as part of the portions of this disclosure related to data collection and analysis (e.g. collecting consumer feedback, building profiles of actual or desired consumers, identifying purchasing trends, etc.) that various artificial intelligence and/or machine learning principles, as would be apparent to one having ordinary skill in those fields, may be applied to determine the methods of and/or enhance the data analysis and/or uncover additional insights. As one example, machine learning may be employed to discern the likelihood of a particular incentive offer resulting in a specific consumer or type of consumer participating in giving feedback about a transaction. Such a determination may be made using a variety of input factors, such as the past behavior of a specific consumer and/or consumers sharing particular characteristics, including derived or inferred characteristics. In some embodiments, various parameters may, in general, be ranked according to an expected likelihood of compatibility. For example, all available incentives could be ranked for likelihood of effectiveness at the time of a transaction based on numerous factors including, but not limited to, demographic and psychographic characteristics of the consumer, geographical location of the point-of-sale, time of day, type of goods or services involved in the transaction, etc.

FIGS. 1 through 10, discussed below, and the various embodiments used to describe the principles of this disclosure are by way of illustration only and should not be construed in any way to limit the scope of the disclosure.

The example architecture 100 includes a network 120 that communicatively couples various devices, including the consumer feedback incentivizing service 102, user device 128, merchant computing system 122, and consumer digital wallet 132. As described further herein, the digital wallet 132 may be configured to be executed by a computing device of a consumer, a computing device of the consumer feedback incentivizing service 102 (e.g., a cloud-based or IoT system), a computing device of a payment processor, financial institution, clearinghouse, credit/debit card company, etc. For example, when the digital wallet 132 is not managed by a computing device of the consumer (e.g., the digital wallet 132 is managed by a computing device associated with a credit/debit card company), the digital wallet 132 may include a data repository that stores incentive offers for a consumer, and the incentive offers are associated with an identifier (e.g., phone number, email address, social security number, biometric information, social media user name, social media avatar, etc.) of the consumer in the data repository. In some embodiments, the digital wallet 132 executing at a computing device remote from the computing device of the user may be synchronized with a digital wallet executing on the computing device of the consumer. In such an instance, the incentive offers may be downloaded to the digital wallet executing on the computing device of the consumer. The network 120 can include local area networks (LANs) and wide area networks (WANs). The network 102 can include wired technologies (e.g., Ethernet®) and wireless technologies (e.g., Wi-Fi®, code division multiple access (CDMA), near-field communication ("NFC"), global system for mobile (GSM), universal mobile telephone service (UMTS), Bluetooth®, and ZigBee®. For example, the user device 104 can use a wired connection or a wireless technology (e.g., Wi-Fi®) to transmit and receive data over the network 120.

In various implementations, all or a portion of the data may be primarily stored or backed up in a distributed ledger system such as, without limitation, blockchain. For example, consumer feedback data may be stored in a distributed ledger system for purposes of maintaining and improving the integrity of the data, which is collected from numerous, disparate devices and sources. Use of a distributed ledger may also enable easier sharing of relevant data across disparate platforms and organizations. A distributed ledger may, in some embodiments, be used to enable and track incentive availability, incentive reward histories, consumer profiles, etc. as further described herein. A distributed ledger may, in some embodiments, be used to enable certain data to be accessed only by authorized parties.

In some embodiments, consumer feedback incentivizing service 102 may be configured to select a consumer to provide feedback related to one or more transactions associated with the consumer. Consumer feedback incentivizing service 102 may then select a survey comprising one or more questions related to the one or more transactions associated with the consumer. For example, consumer feedback incentivizing service 102 may communicate information about the selected consumer and/or transaction(s) to survey generation module 114. In some embodiments, the information communicated to survey generation module 114 about the consumer may include all or part of a stored consumer profile 118. According to some embodiments, survey generation module 114 may then match the consumer or characteristics of the consumer with one or more surveys stored in database 116 of survey generation module 114 and transmit the one or more selected surveys back to consumer feedback incentivizing service 102.

According to some embodiments, consumer feedback incentivizing service 102 may transmit, for display on a wireless device (e.g., user device 128) of the consumer, the one or more selected surveys related to the one or more transactions associated with the consumer. According to some embodiments, consumer feedback incentivizing service 102 transmits one or more surveys to user device 128 for display, via client application 130 showing on a user interface (e.g., a touch screen or other standard computing interface) of user device 128. In some embodiments, the consumer feedback incentivizing service 102 may be configured to perform translation services to enable content to be displayed in any desired/selected language on the display. In some embodiments, the consumer feedback incentivizing service 102 may connect to an application programming interface of a third-party service to perform the translation services.

In some embodiments, the consumer feedback incentivizing service 102 may receive direct payments from merchants subscribed to the service for one or more features offered by the service. In some embodiments, the consumer feedback incentivizing service 102 may partner with one or more third-party digital payment application providers (e.g., Apple Pay®, Google Pay®, Venmo®, Fiserv, etc.) and/or credit/debit card application providers (e.g., Visa®, MasterCard®, such that those providers are configured to collect payments from merchants using the consumer feedback incentivizing service 102. In some embodiments, an intermediary entity may collect payments on behalf of the providers. In some embodiments, the consumer feedback incentivizing service 102 may determine revenue splits (e.g., based on percentages of rights) if desired.

User device 128 may be any suitable computing device, such as a smartphone, tablet, or desktop or laptop computer. User device 128 may include a user interface configured to execute a client application 130. Client application 130 may be implemented in computer instructions stored on one or more memory devices and executed by one or more processing devices of the user device 128. Client application 130 may be a standalone application installed on user device 128 or may be an application that is executed by another application, such as a website in a web browser or another stand-alone application. In some embodiments, a stand-alone application may interact with other applications installed and executed at the wireless device (e.g., user device 128) and/or installed and executed at other computing devices (e.g., computing device 104). In some embodiments, the client application 130 may call one or more web services and/or application programming interfaces to perform one or more operations disclosed herein.

Consumer feedback incentivizing service 102, according to some embodiments, may include a computing device 104 having one or more processors 106 for executing the tasks comprising the consumer feedback incentivizing service 102 and a computing device database 108. Computing device 104 may be any suitable computing device such as a computer server, laptop, tablet, smartphone, or desktop, or Internet of Things (IoT) device, or laptop computer. The computing device 104 may be communicatively coupled to one or more other computing devices of the consumer feedback incentivizing service 102. The computing devices may form a distributed computing system, which may include a cloud-based computing system (e.g., a cloud or IoT computing system or any combination thereof). The one or more processors 106 may be configured to execute computer instructions implementing any method described herein and stored on computing device 104 or elsewhere in the consumer feedback incentivizing service 102. Database 108 of computing device 104 may store any data necessary to enable the operation of the consumer feedback incentivizing service 102. For example, database 108 may include consumer profiles including information associated with consumer profile 118, incentive selection module 110, and/or survey generation module 114. Further, the database 108 may be synchronized with one or more other databases. For example, the one or more other databases may be associated with the digital payment application providers (e.g., Apple Pay®, Google Pay®, Venmo®, etc.) and/or credit/debit card applications (e.g., Visa®, Amex®, MasterCard®, Discover®, etc.) and a synchronization operation may be executed that causes the information related to a consumer stored in the one or more other databases to be downloaded to the database 108. The information may include one or more incentive offers associated with an identifier of the consumer.

In some embodiments, the computing device 104 may execute an artificial intelligence (AI) engine and/or a training engine. In some embodiments, the AI engine includes the training engine. In some embodiments, the training engine is separate from the AI engine. The AI engine may use the training engine to generate one or more machine learning models trained to perform any operation of any method described herein. The one or more machine learning models may be generated by the training engine and may be implemented in computer instructions executable by one or more processing devices of the computing device 104 or user device 128. To generate the one or more machine learning models, the training engine may train the one or more machine learning models. The training engine 130 may use a corpus of training data (e.g., training dataset) as input to generate a desired output. For example, the training data may include inputs associated with attributes of consumers (e.g., consumer transaction history, correlations between goods or services purchased by consumers, consumers' merchant preferences, consumer demographics, consumer psychographics, merchants' consumer preferences, etc.) and outputs that match the inputs to various marketing recommendations (e.g., if consumer bought X, the inputs indicate the consumer may also buy Y; the consumer purchases item X every month, send recommendation to buy X today; consumer is 25 years old and lives in Austin, TX, send recommendation for concert). Further, the training data may include inputs related to received responses to surveys and outputs of marketing recommendations (e.g., certain consumers prefer incentive offers related to beverages more than incentive offers related to food, offer beverage incentive offers to those certain consumers; consumers indicate customer service is poor in the morning, perform additional training or hire new employees for the morning shift).

The one or more machine learning models may refer to model artifacts created by the training engine using training data, wherein the training data includes training inputs and corresponding target outputs. The training engine may find patterns in the training data wherein such patterns map the training input to the target output and generate the machine learning models that capture these patterns. In some embodiments, the artificial intelligence engine and/or the training engine may reside on the computing device 104 and/or the user device 128.

The one or more machine learning models may comprise, e.g., a single level of linear or non-linear operations (e.g., operations performed by a support vector machine (SVM)). The machine learning models may be executed as a deep network, i.e., a machine learning model comprising multiple levels of non-linear operations. Examples of deep networks are neural networks, including generative adversarial networks, convolutional neural networks, recurrent neural networks with one or more hidden layers, and fully connected neural networks (e.g., each artificial neuron may transmit its output signal to the input of the remaining neurons, as well as to itself). For example, the machine learning model may include numerous layers, hidden layers, or any combination thereof, wherein one or more of the foregoing perform calculations (e.g., dot products) using various neurons.

According to some embodiments, consumer feedback incentivizing service 102 may transmit, to incentive selection module 110, information related to the consumer and/or the one or more transactions. According to some embodiments, incentive selection module 110 may then match the consumer or characteristics of the consumer with one or more incentives stored in database 112 of incentive selection module 110 and transmit information about the selected one or more incentives back to consumer feedback incentivizing service 102. Examples of incentives that may be available include the granting of retailer discounts on future purchases, contest entries, free goods or services redeemable at a particular merchant or franchise, reward program points, or any other suitable incentive reward as may be appropriate to the consumers and businesses involved.

Consumer feedback incentivizing service 102 may transmit, for display on a wireless device of the consumer, the one or more incentives selected by incentive selection module 110. According to some embodiments, consumer feedback incentivizing service 102 transmits information related to one or more incentives to user device 128 for display, via a client application 130 showing on a user interface of user device 128.

According to some embodiments, the consumer or other user of user device 128 may input a response to the one or more surveys at the user interface of user device 128. These responses may then be transmitted, via network 120, back to consumer feedback incentivizing service 102.

In response to receiving appropriate survey responses, according to some embodiments, consumer feedback incentivizing service 102 may fulfil the incentive offer. For example, according to some embodiments, consumer feedback incentivizing service may fulfil the incentive offer at least in part by communicating a coupon or voucher to the consumer via user device 128 or other contact information as may be available, for example as part of consumer profile 118. In some embodiments, consumer feedback incentivizing service 102 may fulfil the incentive offer at least in part by adding an incentive benefit to a digital wallet 132 associated with the consumer. For example, consumer feedback incentivizing service may add an incentive reward of a free bagel at a local shop directly into the consumer's digital wallet. Digital wallet 132 according to some embodiments may be Apple Pay™, Google Pay™, Samsung Pay™, PayPal™, DBS PayLah!™, Grab Pay™, or any other suitable digital wallet or digital transaction facilitation application. The digital wallet 132 may be executing at a computing device associated with the consumer feedback incentivizing service 102, at a computing device associated with the consumer (e.g., user device 128), at a computing device associated with a third-party digital payment application, and/or at a computing device associated with a credit/debit card application. In some embodiments, when the digital wallet 132 wallet is executing at the computing device associated with the consumer feedback incentivizing service 102 (e.g., in a cloud-based system and/or IoT-based system), the digital wallet 132 may include a record of identifiers of customers and of incentive offers associated with the identifiers of the customers.

According to some embodiments, some or all of consumer feedback incentivizing service 102 may be in communication with one or more merchant computing systems 122. For example, a merchant, retailer, or other goods or service provider may establish one or more desired consumer profiles 124 stored in a database 126 of merchant computing system 122. The desired consumer profile(s) may define characteristics of consumers that the merchant would like survey answers from. According to some embodiments, merchant computing system 122 may also provide survey preferences and/or survey questions provided by the merchant to consumer feedback incentivizing service 102 and/or survey generation module 114. According to some embodiments, merchant computing system 122 may also provide incentive preferences and/or information about available incentives to consumer feedback incentivizing service 102 and/or incentive selection module 110.

Merchant computing system 122 according to some embodiments may be any suitable computing devices such as a computer server, laptop, tablet, smartphone, or desktop or laptop computer. Database 126 of merchant computing system 122 may store any data necessary to enable the operation of merchant computing system 122.

Figure 2:
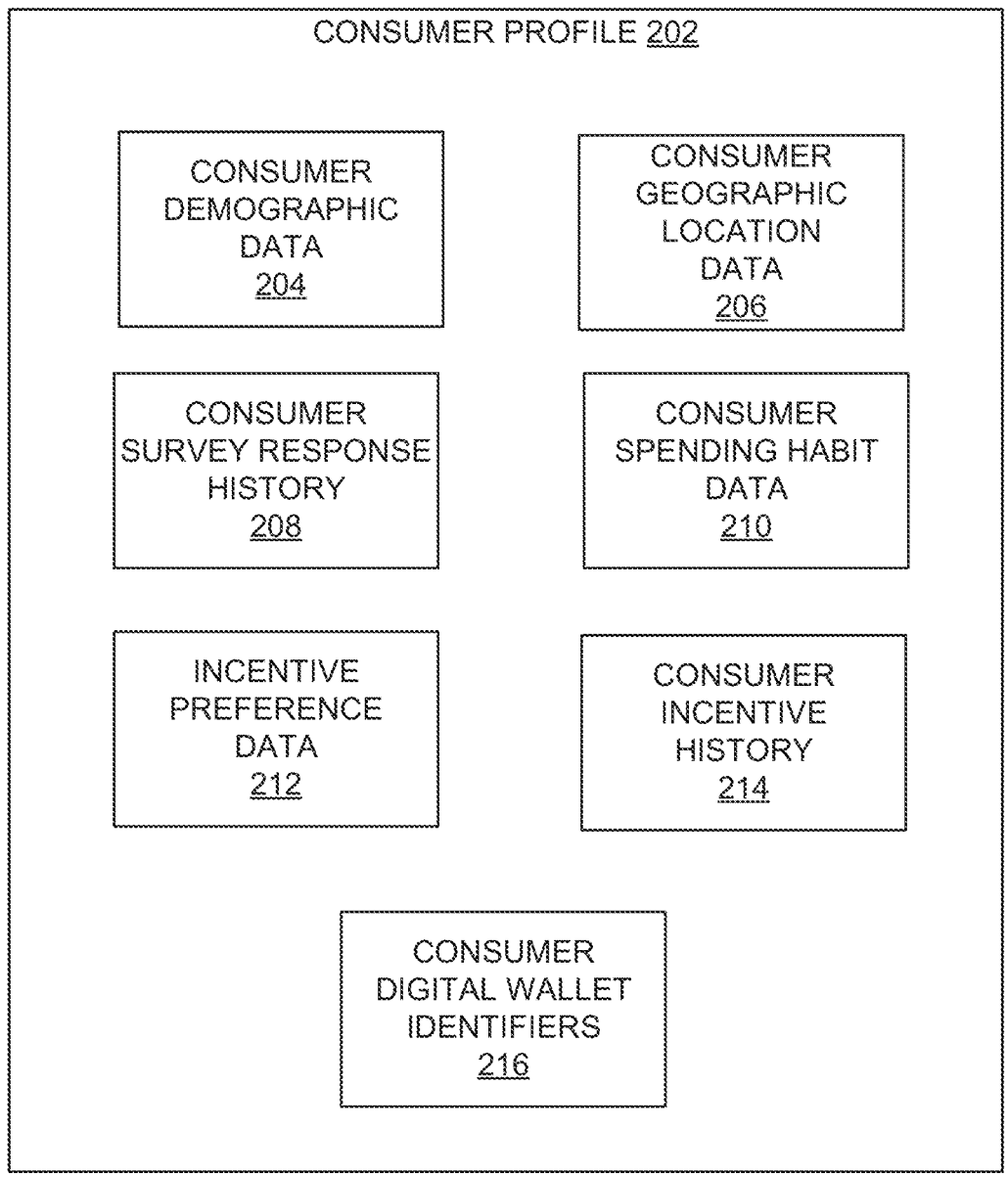
FIG. 2 illustrates details of an example consumer profile according to various embodiments.

FIG. 2 illustrates details of an example consumer profile according to various embodiments. Consumer profile 202 according to some embodiments represents an individual consumer or consumer group. According to some embodiments, a consumer profile 118 of FIG. 1 may be arranged similar to, or contain information similar to, that described herein with respect to consumer profile 202 of FIG. 2. A desired consumer profile 124, according to some embodiments, may be arranged similar to, or contain information similar to, that described here with respect to consumer profile 202 of FIG. 2.

Consumer demographic data 204 of consumer profile 202 may include, according to some embodiments, demographic data associated with one or more consumers, such as age, gender, race, occupation, income, education, hobbies, location of residence, eating habits, travel history, social media membership and "likes", previous reviews, reviews on other platforms, and other suitable demographic information. Consumer demographic data 204 and other information of consumer profile 202 may be ultimately intended to provide a high level of granularity to a merchant when considering who is buying or may be likely to buy particular goods or services.

Consumer geographic location data 206 of consumer profile 202 may include, according to some embodiments, geographical location information such as Global Positioning System ("GPS") or other suitable location information location related to a user's residence, workplace, common vacation or work travel locations, favorite restaurants, etc. Consumer geographic location data 206 may also include actual location history of an individual consumer or group of consumers. According to some embodiments, consumer geographic location data 206 may include projections of likely future location information. Any location information of consumer geographic location data 206, according to some embodiments, may be stored with corresponding data and time stamp information.

Consumer survey response history 208 of consumer profile 202 includes, according to some embodiments, information related to whether, when, and how often one or more consumers associated with consumer profile 202—or people sharing certain actual, predictable or derivable characteristics with those one or more consumers—have responded to previous survey questions presented to the one or more consumers associated with consumer profile 202. Such analysis may, in some embodiments, be aided by the use of various artificial intelligence or machine learning techniques, as appropriate. According to some embodiments, consumer survey response history 208 may include information related to the types of survey questions the one or more consumers associated with consumer profile 202 have responded to in the past, and/or projected characteristics of survey questions the one or more consumers associated with consumer profile 202 may be likely to respond to in the future. In some embodiments, a consumer profile 202 may include projected characteristics of consumers who are likely to respond to the survey questions that are available or expected to be available, or for which answers and feedback are desired.

Consumer spending habit data 210 of consumer profile 202 includes, according to some embodiments, information related to past purchases made by the one or more consumers associated with consumer profile 202. According to some embodiments, consumer spending habit data 210 of consumer profile 202 may further include projections related to likely future spending habits of the one or more consumers associated with consumer profile 202. According to some embodiments, information of consumer spending habit data may include purchase amounts and frequency of various types of purchases, and other appropriate consumer spending habit data as one having ordinary skill in the art would recognize.

Incentive preference data 212 and consumer incentive history 214 of consumer profile 202 include, according to some embodiments, information related to whether, when, and how often one or more consumers associated with consumer profile 202 have responded to previous incentives offered (consumer incentive history 214) in exchange for completing surveys. According to some embodiments, incentive preference data 212 may include information related to the types of incentives the one or more consumers associated with consumer profile 202 have responded to in the past and/or projected characteristics of incentives the one or more consumers associated with consumer profile 202 may be likely to respond to in the future.

Consumer digital wallet identifier(s) 216, according to some embodiments, include any suitable digital wallet or digital transaction facilitation platforms associated with one or more consumers associated with consumer profile 202.

Figure 3:
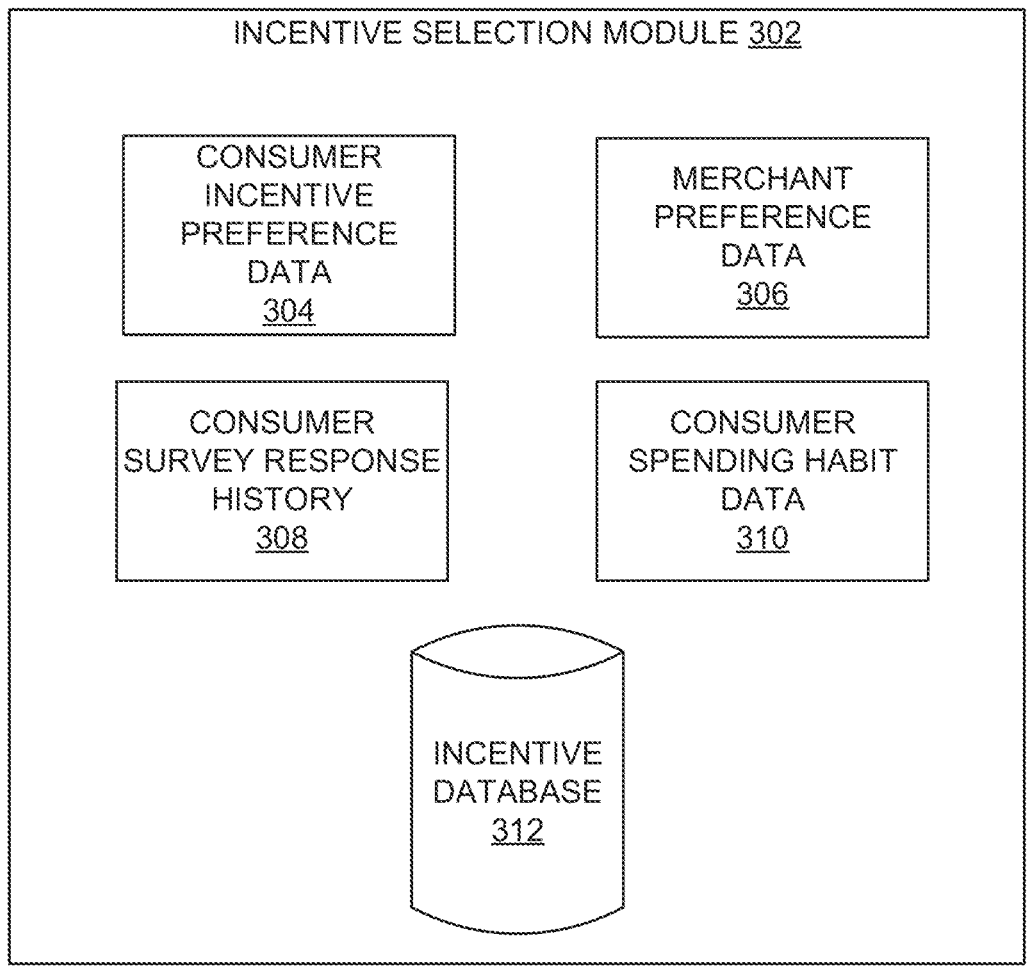
FIG. 3 illustrates details of an example incentive selection module according to various embodiments.

FIG. 3 illustrates details of an example incentive selection module according to various embodiments. Incentive selection module 110 of FIG. 1 may, in some embodiments, be arranged similar to, or contain information similar to, that described herein with respect to incentive selection module 302. Incentive selection module may be configured, inter alia, to combine known characteristics of a selected consumer or group of consumers with a merchant's preference data and available incentives in order to select the best incentive match when taking into account various factors such as likelihood of response and how closely the targeted or selected consumer (also referred to herein as the "immediate consumer") matches the merchant's preference.

Consumer incentive preference data 304, according to some embodiments, may include information related to the types of incentives the immediate consumer or group of consumers has responded to in the past and/or projected characteristics of incentives the immediate consumer or group of consumers may be likely to respond to in the future.

Merchant preference data 306, according to some embodiments, may include any information provided by a merchant or merchants about a desired consumer that the merchant or merchants would like to have survey feedback data from. Merchant preference data, according to some embodiments, may be input via a merchant interface and survey results may be provided to the merchant through the same interface or another interface. According to some embodiments, merchant preference data may include some or all of the information of a desired consumer profile, which may be similar to a consumer profile 202 as discussed with respect to FIG. 2.

Consumer survey response history 308 includes, according to some embodiments, information related to whether, when, and how often one or more consumers have responded to previous survey questions presented to the immediate consumer or group of consumers. According to some embodiments, consumer survey response history 308 may include information related to the types of survey questions the consumer or group of consumers has responded to in the past, and/or projected characteristics of survey questions the consumer or group of consumers may be likely to respond to in the future.

Consumer spending habit data 310 includes, according to some embodiments, information related to past purchases made by the immediate consumer or group of consumers. According to some embodiments, consumer spending habit data 310 may further include projections related to likely future spending habits of the immediate consumer or group of consumers. According to some embodiments, information of consumer spending habit data may include purchase amounts and frequency of various types of purchases, and other appropriate consumer spending habit data as one having ordinary skill in the art would recognize.

Incentive database 312, according to some embodiments, may be populated with incentives provided by merchants and available immediately, at any time in the future, and/or at other franchise locations or retailers—for example, a free drink or free donut at a local donut shop. According to some embodiments, incentive database 312 may also or alternatively include incentives generated by consumer feedback incentivizing service 102 or other appropriate sources.

Figure 4:
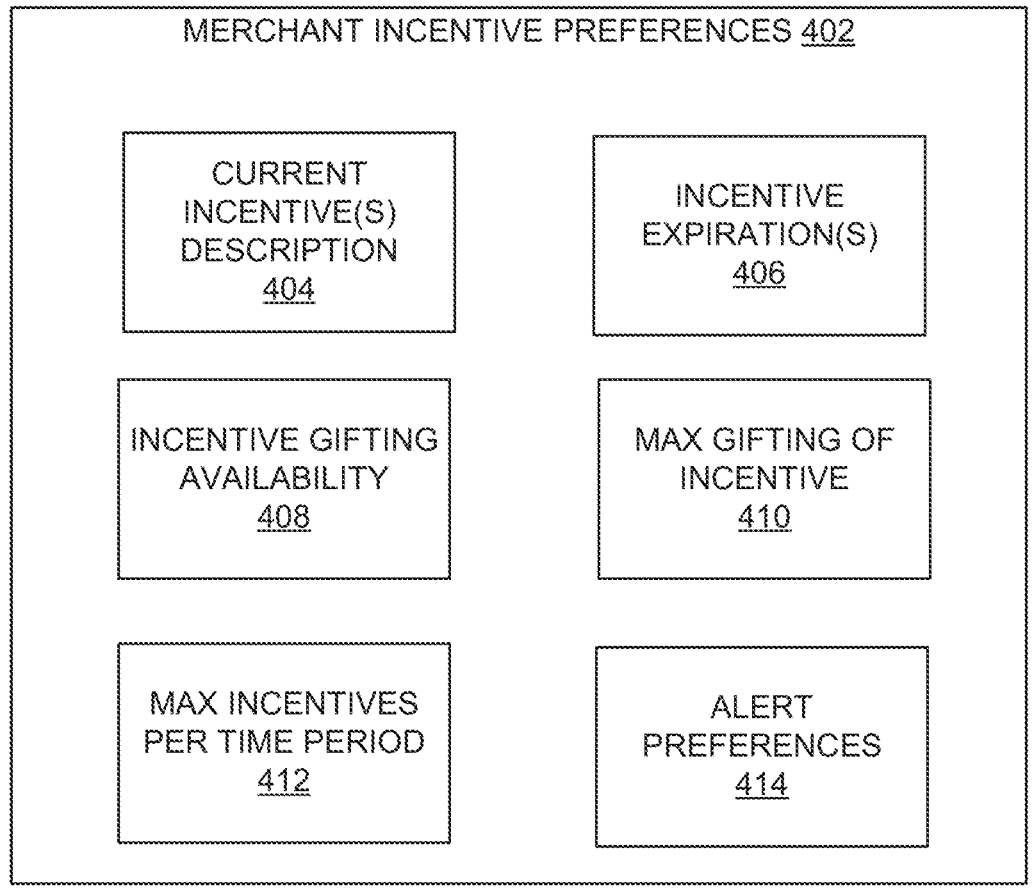
FIG. 4 illustrates a partial list of available merchant incentive preferences according to various embodiments.

FIG. 4 illustrates a partial list of available merchant incentive preferences according to various embodiments. Merchant incentive preferences 402 according to some embodiments represent an individual merchant, retailer, or service provider or a group of merchants, retailers, or service providers. According to some embodiments, merchant incentive preferences may be communicated, for example, from a merchant computing system 122 to an incentive selection module 110 as described with reference to FIG. 1.

According to some embodiments, current incentive(s) description 404 includes details of what incentives are offered by a merchant or group of merchants, how long they are offered, which characteristics of consumers, if any, are required in order to make the offer, and any other appropriate descriptive incentive details as one having ordinary skill in the art would recognize.

Incentive expiration information 406 of merchant incentive preferences 402 may include information including one or more expiration dates associated with available incentives or incentive descriptions 404. "Max incentives per time period" 412 of merchant incentive preferences 402 may define, according to some embodiments, the maximum number of incentives available to an individual consumer or group of consumers within a defined period of time. According to some embodiments, max incentives per time period 412 may define the maximum number of incentives associated with a particular merchant or group of merchants that may be made available to any party during a defined period of time.

Incentive gifting availability 408 of merchant incentive preferences 402 may include, according to some embodiments, information related to whether, how often, and how many times various incentives may be gifted from the original earner to third parties. For example, as described elsewhere herein and according to some embodiments, after the incentive has been fulfilled or delivered to a digital wallet of a consumer, the consumer may be presented with an option to gift the same or similar incentive to a third party, or to split a gift incentive among multiple parties. According to some embodiments, "max gifting of incentive" 410 may define, with regard to one or more incentives, a maximum number of times an incentive may be gifted during a defined period of time, during the life of the incentive, during the life of the consumer or merchant, or any other appropriate restriction as would be apparent to one having ordinary skill in the art.

According to some embodiments, alert preferences 414 may define the type and frequency of notifications provided to consumers and/or merchants regarding incentive status or earning.

Figure 5:
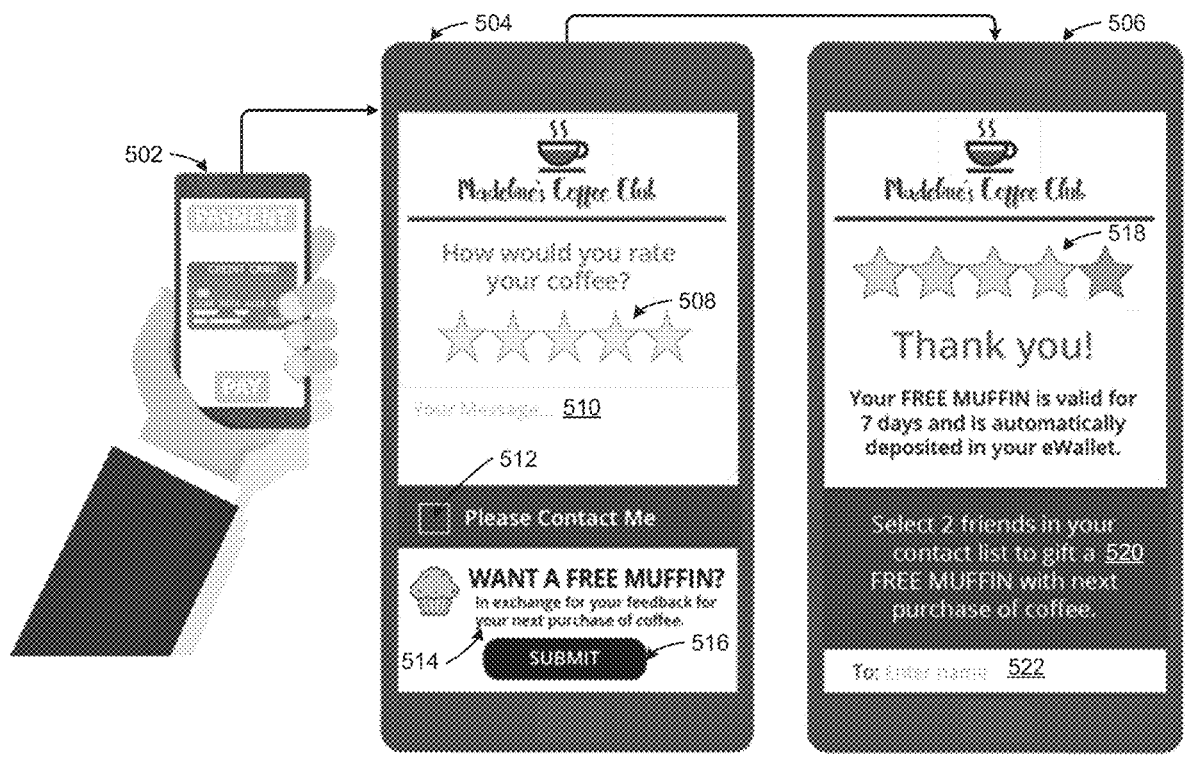
FIG. 5 illustrates example consumer device applications screens according to some embodiments of the present disclosure.

FIG. 5 illustrates example consumer device application screens according to some embodiments of the present disclosure. All aspects of the interface and content presented here are merely exemplary and shall not, for example, be understood to limit the disclosure to any particular user interface configuration.

Screen 502 shows an exemplary payment interface on a user device, for example user device 128 as described with reference to FIG. 1. At screen 502, a user is presented with options to complete payment associated with a purchase. According to some embodiments, this payment screen may be a digital wallet application itself or linked to a digital wallet of the user.

After payment is completed, according to some embodiments, the user is presented with screen 504. Interface 508 presents, as an example, a survey question in the simple and familiar "star rating" format. The commonly used "star rating" format is merely exemplary, and numerous other simple rating systems are available, as would be apparent to one having ordinary skill in the art. Field 510 according to some embodiments allows the user to type a message to the retailer if desired.

According to some embodiments, selection 512 of screen 504 allows the user to specify that the user would like to be contacted by the merchant, for example in the event the user has a complaint or praise to share regarding the goods or services of the merchant or service provider.

At location 514 of screen 504, according to some embodiments, an incentive is presented to the user to entice the user to complete the survey question 508. According to some embodiments, submit button 516 allows the user to choose to claim the incentive offered at location 514 of screen 504.

After completion of the survey question 508 of screen 504 and claiming the incentive offered at location 514 of screen 504, the user is presented, according to some embodiments, with screen 506 or similar Interface location 518 displays, according to the exemplary embodiment, the results of the consumer or user's response to survey question 508.

At location 520 of screen 506, the user is presented, according to some embodiments, with an offer to gift an incentive to one or more third parties. According to some embodiments, field 522 of screen 506 allows the user to enter identification information of one or more third parties to receive a gifted incentive. For example, a user may enter into field 522 one or more e-mail addresses, digital wallet IDs, phone numbers, messenger application IDs, biometric information, encryption or other keys, or other appropriate identification information as would be apparent to one having ordinary skill in the art.

In some embodiments, the consumer's contact list stored on their wireless device may be used to automatically populate the field 522 based on characters entered into the field 522 (e.g., autofill functionality). Further, the contact list may include social media contacts that the user is "friends" with or subscribes to or follows or equivalent on any social media platform for which the consumer is registered. Further, the contact list may include contacts of their social media contacts, contacts of those contacts, further nth-degree contacts, and so on. Accordingly, the consumer may to some degree function as a social media influencer by gifting the incentive offer to any suitable contact to which the consumer has a direct or indirect connection (e.g., friend, follows, etc.) on any of the social media platforms. Further, the consumer may share social media posts with those contacts and the social media posts may include information pertaining to the responses the consumer entered regarding the survey. Sharing the social media posts with contacts may cause those contacts to be "tagged" in the social media post, thereby triggering a notification to be sent to a user account associated with those contacts. Further, sharing the social media posts with the contacts may cause a direct message to be sent to a message inbox associated with a user account of those contacts.

In some embodiments, a merchant may generate an incentive offer that can be shared with multiple people with or without being directed to them (e.g., the incentive offer is not tied to a specific customer or usable only once). For example, an incentive offer may be shared (e.g., via a social media post) by a merchant or a customer, and once shared, any member of the social media platform that has access to the social media post may be enabled to download and/or use the incentive offer posted (e.g., via a code or link in the social media post) in the social media post.

In some embodiments, the consumer may select an option to gift the incentive offer to a direct or indirect social media contact and a link may be generated and included in a social media post that is posted on one or more social media platforms. The social media post may be shared with the selected social media contact and the social media contact may be tagged in the social media post. That is, the username or "handle" of the social media contact may be included in the social media post such that a notification is sent to the account of the social media contact. The notification may indicate that the consumer gifted the social media contact an incentive offer and the social media contact may be presented with the link to the incentive offer. The link may be unique in that it may redirect back to a specific, discrete offer, e.g., for a free muffin, if the social media contact visits the merchant (e.g., at a physical or virtual location) within a certain period of time (e.g., within the next 7 days).

Figure 6:
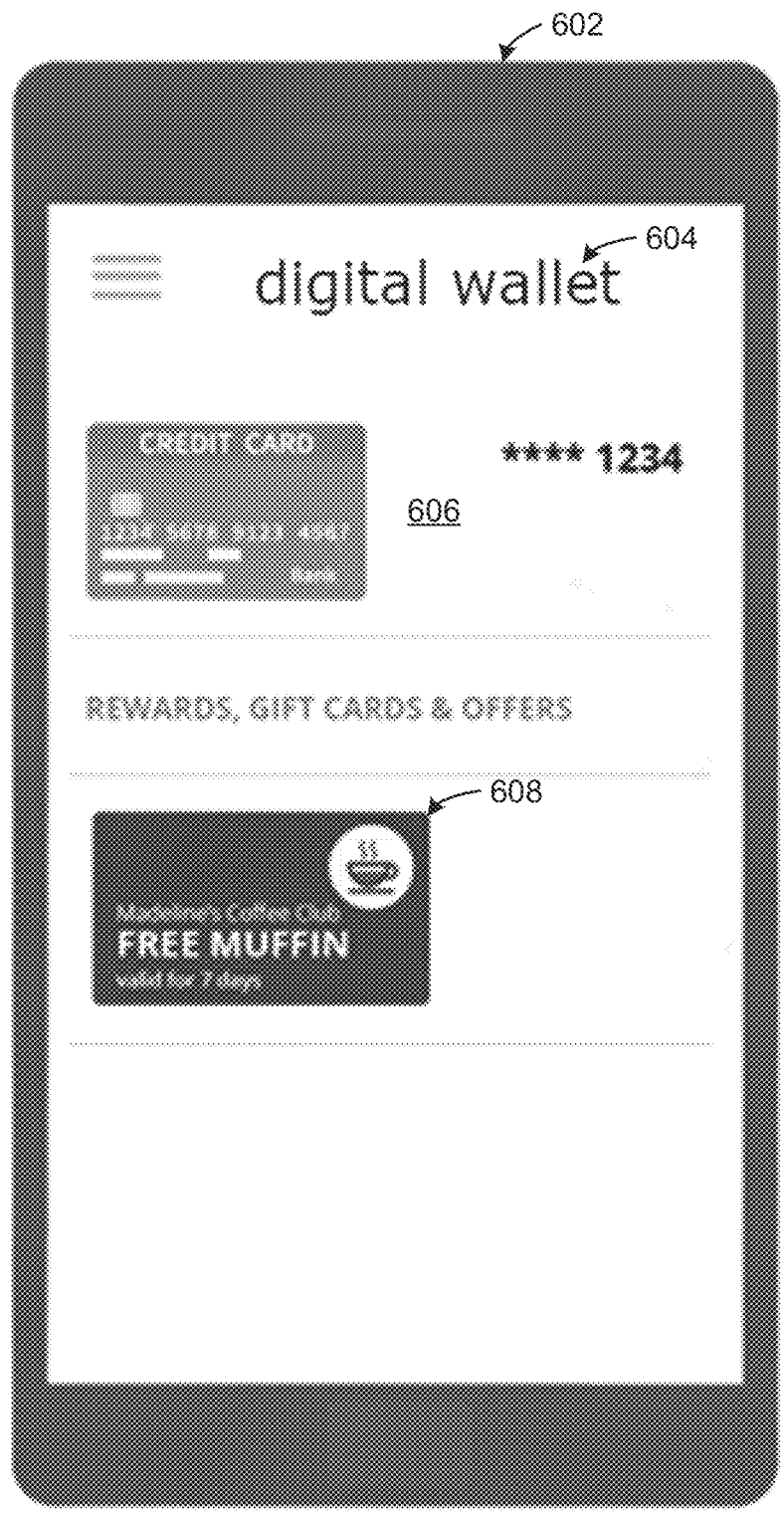
FIG. 6 illustrates an example display of an incentive reward appearing in a digital wallet interface according to some embodiments.

FIG. 6 illustrates an example display of an incentive reward appearing in a digital wallet interface. According to some embodiments, screen 602 may represent a digital wallet application or another client application, for example client application 130 of user device 128 as described with reference to FIG. 1.

Identifier 604 of screen 602, according to some embodiments, identifies the particular digital wallet or other payment platform in present use. At field 606 in the exemplary embodiment, a user is presented with credit/debit card information related to the digital wallet and/or a recent transaction or transactions.

At location 608 of screen 602, an incentive reward is shown as being available in the digital wallet 604. According to some embodiments, and as discussed in further detail herein, an incentive reward may be transmitted to or enabled directly in a consumer's digital wallet in response to the consumer completing one or more prerequisites to earning the incentive—for example by transacting business with and completing a survey question from an incentivizing merchant.

Figure 7:
FIG. 7 illustrates an example display of an electronically generated social media post according to some embodiments.

FIG. 7 illustrates an example display of an electronically generated social media post. According to some embodiments, screen 702 may represent a social media post automatically generated on behalf of a user, for example by a consumer feedback incentivizing service 102 as described with reference to FIG. 1.

Identifier 704 of screen 702, according to some embodiments, identifies the particular social media platform in present use. Example profile information 706 of screen 702 shows an identity of the member of social media platform 704 who will make the social media posting.

According to some embodiments, social media post 708 includes a message automatically generated on behalf of the social media user. Controls 710 of screen 702, according to some embodiments, provide additional controls related to social media posting. According to some embodiments, field 712 of exemplary screen 702 allows the social media user to add additional comments to the social media posting, if desired.

The user device 128 may have previously presented a user interface to the consumer that included an option to share the responses to the survey to the social media platform. For example, screen 506 of FIG. 5 may include the option to share the consumer's responses to the survey (e.g., the star rating) to one or more social media platforms (e.g., Twitter®, Facebook®, Instagram®, YouTube®, Twitch®, Snapchat®, Clubhouse®, etc.). Accordingly, the consumer feedback incentivizing service 102 may include one or more application programming interfaces communicatively coupled to one or more application programming interfaces of the one or more social media platforms. As such, the disclosed techniques may further enable interoperability between disparate, distal and/or heterogeneous systems.

The consumer feedback incentivizing service 102 may store certain credentials of the consumer's accounts for each of the respective one or more social media platforms. The credentials may be used to log the consumer into their account with the social media platforms (e.g., single sign in). To enable the consumer to select to generate a social media post and to transmit the social media post 708 to be presented in the social media platforms, the session may be maintained between the consumer feedback incentivizing service 102 and the social media platforms.

As depicted, if the user selected the option to share the responses to the survey with Twitter®, for example, then the social media post 708 may be presented as being associated with the account of the consumer on the social media platform. The social media post 708 states "Jim Just Scored ZENKAFE 5 Stars on His Visit! #Zenkafe #freemuffin." As depicted, two hashtags are included in the social media post 708. The hashtags may be automatically generated based on metadata associated with the survey. For example, the identity of the merchant #Zenkafe is populated as a hashtag in the social media post 708. Further, the consumer elected to receive the incentive offer of the free muffin, and thus, the hashtag #freemuffin is populated as a hashtag in the social media post 708.

In some embodiments, the consumer is presented with a screen to edit the social media post 708 before it is posted to the social media platform. In such an embodiment, the consumer may add the hashtags and/or change any text included in the social media post 708 before it is posted to the social media platform.

Figure 8:
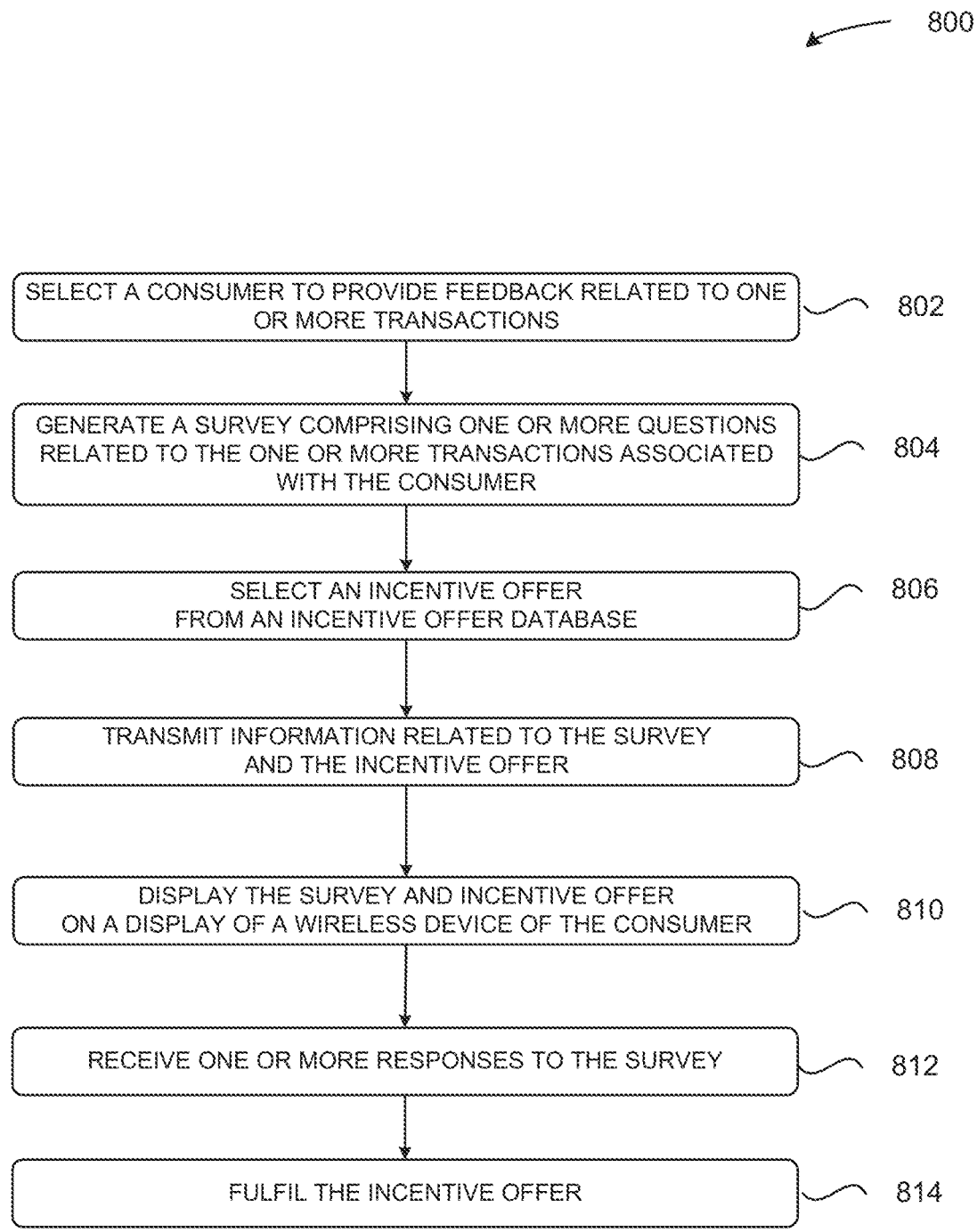
FIG. 8 represents a flowchart for a method of receiving real-time consumer transactional feedback according to some embodiments of this disclosure.

FIG. 8 represents a flowchart 800 for a method of receiving real-time consumer transactional feedback. According to some embodiments, some or all of the steps of flowchart 800 may be carried out by a system like system 100 as described with reference to FIG. 1.

At step 802, a consumer is selected to provide feedback related to one or more transactions conducted by the consumer. According to some embodiments, the consumer may be selected based on matching characteristics of a desired consumer profile provided by a merchant. In some embodiments, a consumer may be selected at least in part on the basis of the consumer having transacted business with a particular merchant's or set of merchants that have requested that all of that merchant or set of merchant's customers be surveyed.

At step 804, a survey is generated for the consumer, the survey comprising one or more questions related to the one or transactions associated with the consumer. As just a few examples, a survey question may simply ask for a general level of satisfaction with the merchant's services, with the merchant's product offering, or with the transaction generally.

At step 806, an incentive offer is selected. According to some embodiments, the incentive offer may be selected from an incentive database, for example because the consumer or transaction matches characteristics of a desired consumer profile provided by a merchant.

At step 808, according to some embodiments, information related to the survey and the incentive offer is transmitted to the user or the user's device. In a typical embodiment, the survey and incentive offer may be presented to the consumer on the consumer's device (e.g., smartphone) via a touch user interface (step 810).

At step 812, a response to the survey is received from the user or consumer. For example, in a typical implementation, a consumer would use a touch screen of the consumer's device to complete the survey.

At step 814, in response to receiving the survey response (according to some embodiments, a prerequisite for obtaining the incentive), the incentive is fulfilled. For example, the incentive information may be transmitted to the consumer's device or directly to the consumer's smart wallet.

Figure 9:
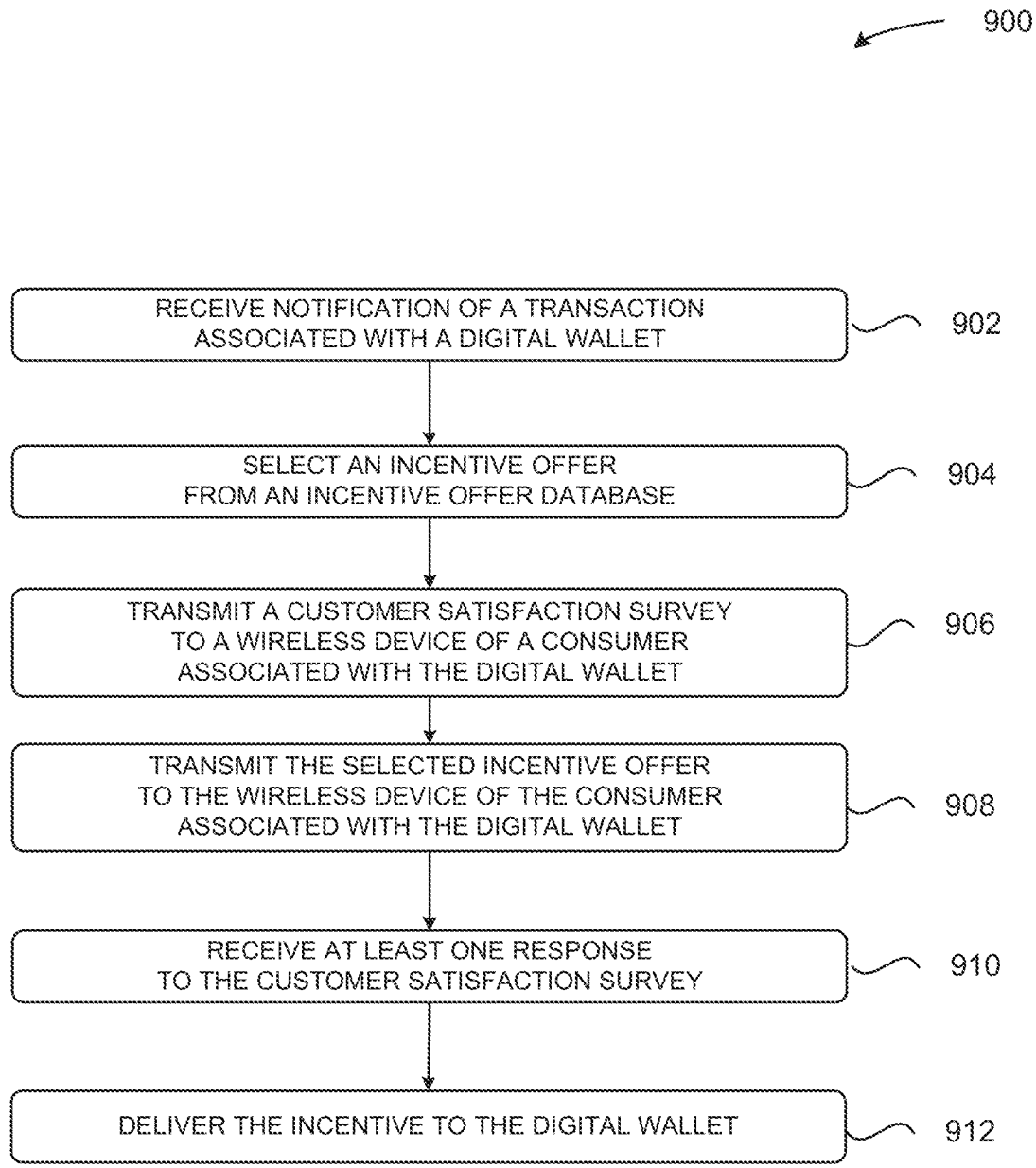
FIG. 9 represents a flowchart of another method of receiving real-time consumer transactional feedback according to some embodiments of this disclosure.

FIG. 9 represents a flowchart of another method of receiving real-time consumer transactional feedback according to some embodiments of this disclosure. According to some embodiments, some or all of the steps of flowchart 900 may be carried out by a system like system 100 as described with reference to FIG. 1.

At step 902, a notification is received of a transaction associated with a digital wallet. The particular digital wallet may, according to some embodiments, be associated with a consumer who has conducted business with a merchant.

At step 904, an incentive offer is selected from an incentive offer database. As described elsewhere herein, an incentive offer may be selected based on various combinations of preferences of a merchant, preferences of the consumer associated with the digital wallet, spending habits, and other consumer or merchant profile information.

At step 906, a customer satisfaction survey is sent to a wireless device of the consumer associated with the digital wallet. According to some embodiments, the satisfaction survey may include a simple star rating for the digital wallet transaction. The incentive offer of step 904, according to some embodiments, is intended to incentivize a response by the consumer to the customer satisfaction survey.

At exemplary step 908, the incentive offer is transmitted to a wireless device of the consumer associated with the digital wallet. The incentive offer may typically be displayed via a touch screen user interface of the wireless device of the consumer associated with the digital wallet.

At step 910, at least one response to the customer satisfaction survey is received. In the exemplary case of a transaction star rating, this step indicates that the consumer associated with the digital wallet has rated the transaction.

At step 912, the incentive reward is credited, deposited, and/or stored directly into the digital wallet. For example, if the incentive reward is a free muffin, the incentive reward may be displayed in the digital wallet user interface in a similar manner as location 608 of screen 602 as described with reference to FIG. 6.

Figure 10:
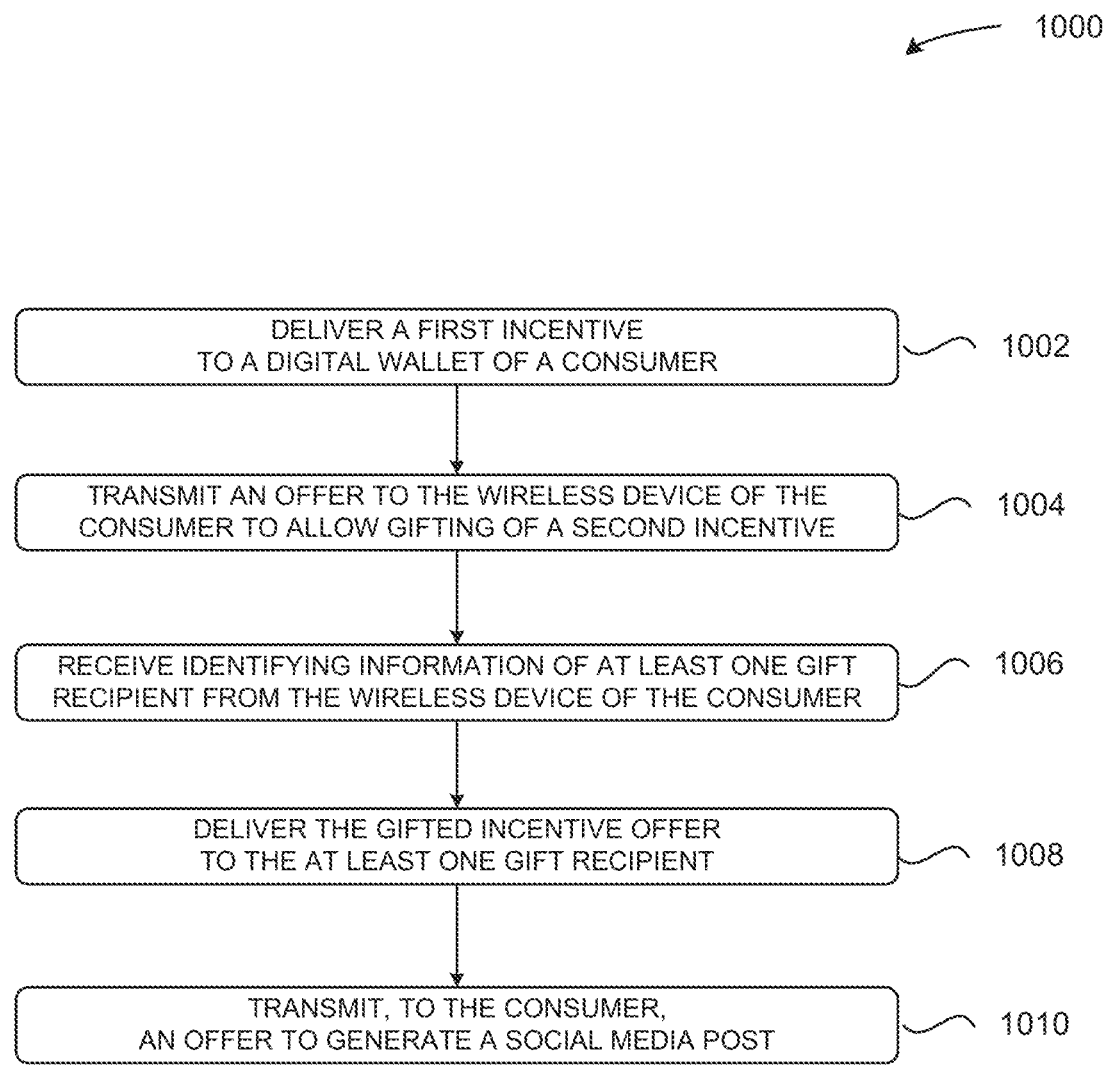
FIG. 10 represents a flowchart of a method for delivering an incentive to a digital wallet and allowing a consumer to gift an incentive offer to a third party, according to various embodiments of this disclosure.

FIG. 10 represents a flowchart of a method for delivering an incentive to a digital wallet and allowing a consumer to gift an incentive offer to a third party, according to various embodiments of this disclosure. According to some embodiments, some or all of flowchart 1000 may be performed by a system similar to system 100 as described with reference to FIG. 1.

At step 1002, a first incentive is delivered to a digital wallet of a consumer. For example, an incentive reward corresponding to a particular merchant may be delivered as explained in detail herein.

At step 1004, an offer to allow gifting of a second incentive from the consumer is made to one or more third parties. In some embodiments, the second incentive may be a duplicate of the original incentive reward of step 1002. According to some embodiments, the gifting offer may be displayed at a user interface of a wireless device associated with the consumer.

At step 1006, identification information related to the one or more third parties to receive a gifted incentive is received. The identification information may include, for example, any of an email address, digital wallet ID, or other appropriate identification information as would be apparent to one having ordinary skill in the art.

At step 1008, according to some embodiments, the one or more gifted incentive offers are delivered to the one or more identified third-party recipients using the identification information obtained at step 1006.

At optional step 1010, according to some embodiments, an offer is transmitted to the consumer to generate a social media post on the consumer's behalf. According to some embodiments, the offer may be presented at a user interface of a wireless device associated with the consumer.

Figure 11:
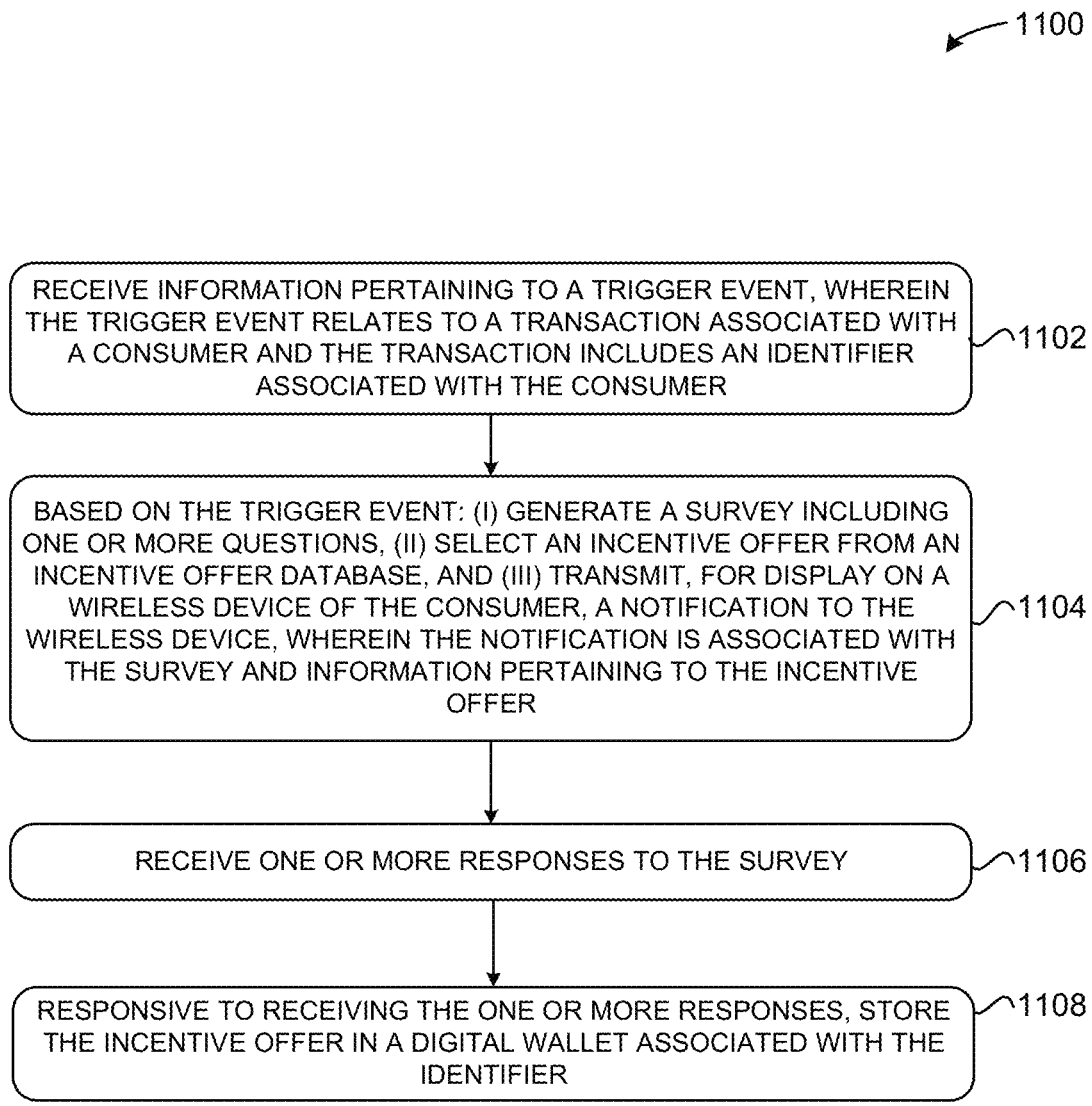
FIG. 11 represents a flowchart of a method for determining a trigger event occurred and delivering an incentive offer to a digital wallet, according to various embodiments of this disclosure.

FIG. 11 represents a flowchart of a method 1100 for determining a trigger event occurred and delivering an incentive offer to a digital wallet, according to various embodiments of this disclosure. The method 1100 may be performed by processing logic that may include hardware (circuitry, dedicated logic, etc.), firmware, software, web services (e.g., a software system configured to support machine to machine interaction over a network), application programming interfaces (APIs) (e.g., a software interface that offers services to other software), or a combination of them. The method 1100 and/or each of their individual functions, subroutines, methods (object-oriented programming), or operations may be performed by one or more processing devices (e.g., any component of the system 100 of FIG. 1) implementing the method 1100. The method 1100 may be implemented as computer instructions executable by a processing device of the control system (e.g., a computer-readable medium may be used to store instructions that, when executed, cause a processor to perform the following steps or processes of the method 1100).

In some embodiments, one or more machine learning models may be generated and trained by the artificial intelligence engine and/or the training engine to perform one or more of the operations of the methods described herein. For example, to perform the one or more operations, the processing device may execute the one or more machine learning models. In some embodiments, the one or more machine learning models may be iteratively retrained to select different features capable of enabling optimization of output. The features that may be modified may include a number of nodes included in each layer of the machine learning models, an objective function executed at each node, a number of layers, various weights associated with outputs of each node, and the like.

At step 1102, the processing device may receive information pertaining to a trigger event. In some embodiments, the processing device may determine, based on the information, that the trigger event occurred. The trigger event may relate to a transaction associated with a consumer and the transaction may include an identifier associated with the consumer. In some embodiments, the identifier may be a phone number the consumer enters at a point-of-sale system (e.g., a computer terminal, a tablet, a laptop, a smartphone, etc.) located at a store, kiosk, booth, station, or any suitable physical location. In some embodiments, the identifier may include (i) a phone number, (ii) a name, (iii) a passport identifier, (iv) a physical address, (v) an email address, a birthdate, (vi) a biometric identifier such as facial recognition, a fingerprint, or a retinal scan, (vii) a driver's license number, (viii) a social security number, (ix) a user identification number, (x) a government-issued identity card number, (xi) social media username, (xii) social media avatar, or some combination thereof. In some embodiments, the identifier may be received from the consumer, a cellular service provider, a credit/debit card company, an association, a financial institution, a clearinghouse, a gateway, a digital payment application provider, etc.

In some embodiments, the transaction the transaction may be initiated by the consumer using a credit/debit card. For example, the consumer may use a credit/debit card at the point-of-sale system separate from the wireless device (e.g., user device 128) of the consumer. In some embodiments, the transaction may be initiated at the wireless device of the consumer (e.g., the user may initiate the transaction via a stand-alone application installed on the wireless device or via a web browser executing on the wireless device).

The transaction may include the consumer using the point-of-sale system to purchase a good or service. The point-of-sale system may be communicatively coupled to a payment processor, such as a credit/debit card company's computing device and, to approve the transaction, may transmit a request to the payment processor. The payment processor may analyze the transaction, and if approved, may transmit data to the consumer feedback incentivizing service 102.

At step 1104, based on the trigger event occurring, the processing device may (i) generate a survey including one or more requests for information (e.g., questions, prompts, inquiries, choices, true/false statements, etc.), (ii) select an incentive offer from an incentive offer database, and/or (iii) transmit, for display on a wireless device of the consumer, a notification to the wireless device. The notification may include information associated with the survey (e.g., the survey or an invitation to complete the survey) and information pertaining to the incentive offer, as presented in FIG. 5. The incentive offer that is selected may be predetermined, may be based on attributes associated with the consumer (e.g., consumer profile including demographic data, geographical location data, survey response history, spending habit data, incentive preference data, consumer incentive history, etc.), attributes associated with the merchant, or the like. In some embodiments, the notification may include a text message (e.g., Short Message Service (SMS), or any other messenger application (e.g., WhatsApp®, Telegram®, Signal®, Facebook Messenger®, Snapchat®, Kik®, Skype®, etc.)), QR code, email message, notification, etc. that includes information associated with the survey (e.g., the survey or an invitation to complete the survey) and information pertaining to the incentive offer.

In some embodiments, the text may include an option to claim the incentive offer when providing responses to the survey. In some embodiments, the text may include a link to a website associated with the payment processor. Selecting the link may cause a web browser to launch a website, wherein the selection uses a Uniform Resource Locator (URL) associated with the payment processor. The website may present a digital wallet including various incentive offers the consumer has obtained over time associated with various merchants. In some embodiments, the user may transmit a response to the notification, which may trigger execution of computer instructions at the consumer incentivizing service 102.

Further, a total point indicator may include a summation of a number of points the consumer has accumulated over time by providing feedback (e.g., responses) to surveys. In some embodiments, the consumer may be awarded a certain number of points when the user provides responses to surveys. "Points" may refer to a numerical value that has a certain unit representing a quantity. The merchants may configure the number of points and the number of points may differ or be the same for merchants. The payment processor, the third-party payment application, and/or the wireless device of the consumer may maintain the accumulated number of points associated with the identifier of the consumer. When the consumer obtains a certain threshold number of points, the consumer may be notified they are entitled to redeem one or more food items, beverages, items, tickets, or any suitable good or service associated with the merchant from which the points were awarded. The consumer may be presented with a list of goods and/or services to redeem using their available points. In some embodiments, when the consumer satisfies the threshold number of points, an incentive offer may be automatically deposited in the digital wallet associated with the consumer. The points may be associated with the digital wallet and/or the identifier of the consumer being managed by the payment processor, payment association (e.g. American Express®, Mastercard®, Visa®), a third-party payment application, and/or the wireless device of the consumer.

At step 1106, the processing device may receive one or more responses to the survey. The one or more responses to the survey may trigger execution of computer instructions at the consumer feedback incentivizing service 102. In some embodiments, the one or more responses to the survey are entered via a user interface of a stand-alone application installed on the wireless device, or the one or more responses to the survey are entered via a website executing in a web browser installed on the wireless device. In some embodiments, the one or more responses may be entered as a text message (e.g., SMS message, or any other messenger application (e.g., WhatsApp®, Telegram®, Signal®, Facebook Messenger®, Snapchat®, Kik®, Skype®, etc.)), QR code, email message, etc. and sent to a computing device 104 separate from the wireless device (e.g., user device 128).

At step 1108, responsive to receiving the one or more responses, the processing device may store the incentive offer in a digital wallet associated with the identifier. In some embodiments, the digital wallet may be configured to be maintained, managed, and/or executed on a computing device 104 in a cloud-based computing system (e.g., cloud or IoT system or any combination thereof). That is, the digital wallet may be managed by a computing device separate from the wireless device (e.g., user device 128) of the consumer. In some embodiments, the digital wallet may be implemented in computer instructions stored on one or more memory devices and executed by one or more processors. In some embodiments, the digital wallet may be maintained, managed, and/or executed by a computing device of a third-party entity, and the computing device of the third-party entity may be configured to process the transaction. For example, the third-party entity may be a payment processor, such as a credit/debit card company (e.g., Visa®), association, etc. a financial institution, such as an issuing bank (e.g., Bank of America®, or a clearinghouse). In such embodiments, the third-party may implement a data repository or database that stores the identifier associated with the consumer and one or more incentive offers claimed by the consumer. In such an instance, a consumer may enter a store (e.g., without their wireless device) and use an incentive offer by providing their identifier to a merchant that uses the identifier to obtain the consumer's incentive offer from the data repository maintained by the third-party. In some embodiments, a computing device associated with the third-party may transmit the identifier to the consumer feedback incentivizing service 102 to enable the consumer feedback incentivizing service 102 to synchronize the database 108 using the identifier with claimed incentive offers by the consumer. In some embodiments, the digital wallet may be maintained, managed, and/or executed by the wireless device (e.g., user device 128) of the consumer.

Figure 12:
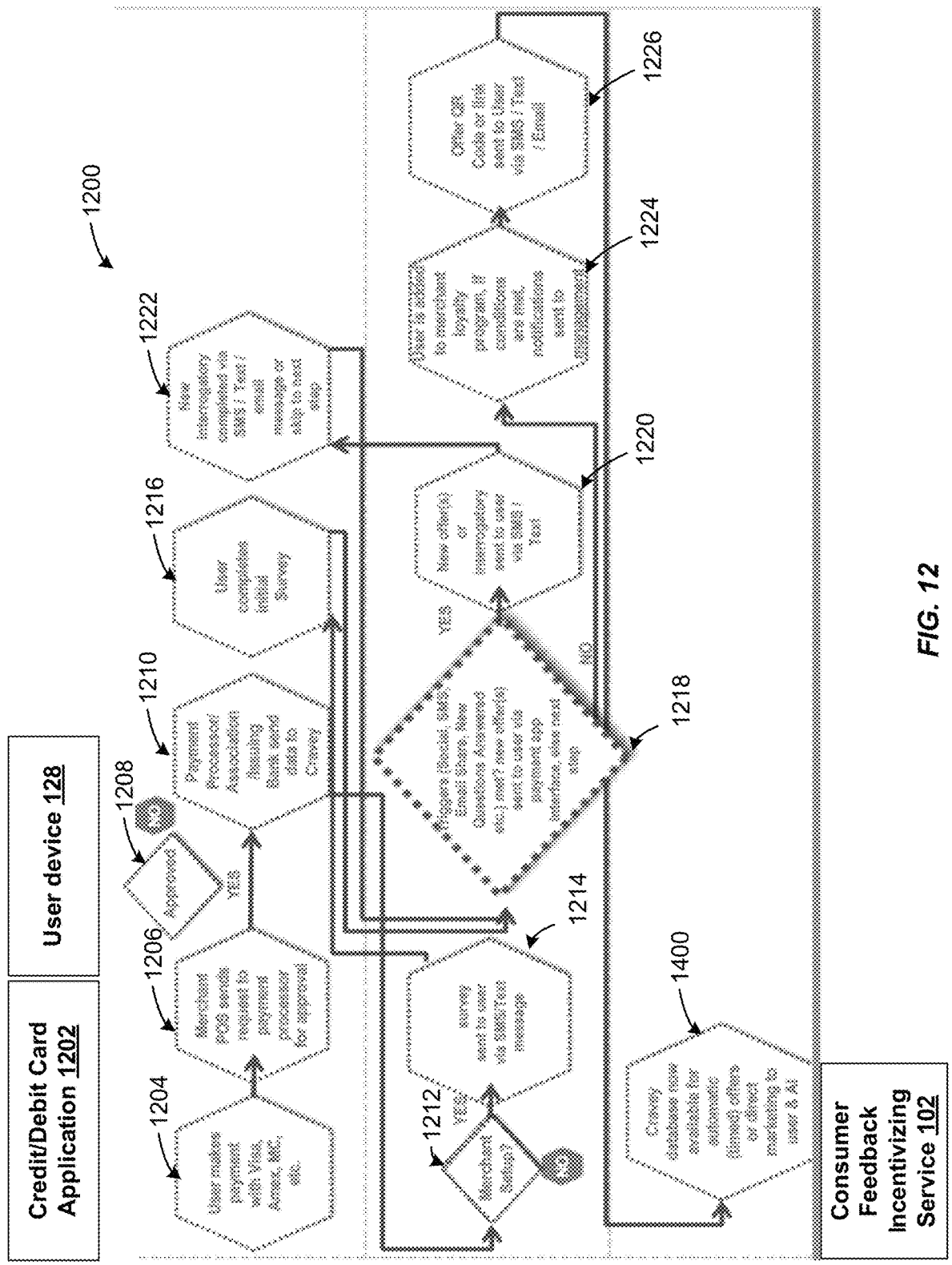
FIG. 12 represents a flowchart of a method for credit/debit card processing via a credit/debit card application installed separately from a consumer's wireless device, according to various embodiments of this disclosure.

FIG. 12 represents a flowchart of a method 1200 for credit/debit card processing via a credit/debit card application 1202 installed separately from a consumer's wireless device, according to various embodiments of this disclosure. One or more of the steps in the method 1200 may be performed by the credit/debit card application 1202, the user device 128, and/or the computing device 104 of the consumer feedback incentivizing system 102. It should be noted that the method 1200 may be performed without a separate third-party digital payment application being installed on the wireless device (e.g., user device 128) of the consumer. Instead, a web browser installed on the wireless device of the consumer may be used to perform various steps of the method 1200. The credit/debit card application 1202 may be installed on a computing device (e.g., server) associated with a provider of the credit/debit card application 1202 (e.g., credit/debit card company such as Visa®, Amex®, MasterCard®, Discover®, etc.), financial institution such as a bank (Bank of America®, Fiserv®) etc.) or may be installed at the computing device 104.

At step 1204, the method 1200 may include a user making a payment with a credit/debit card (e.g., Visa®, Amex®, MasterCard®, Discover®, etc.). The payment may be associated with a transaction the user makes at a point-of-sale system at a physical location of a merchant. The transaction may represent a trigger event and the user may enter an identifier when making the transaction. The identifier may include a phone number, for example. The transaction may involve the user purchasing a good or service at the point-of-sale system and using (e.g., insert, swipe, or tap) the credit/debit card to perform the transaction. At step 1206, the method 1200 may include the merchant's point-of-sale system requesting the credit/debit card application 1202 to approve the transaction. At step 1208, if the credit/debit card application 1202 declines the transaction, the method 1200 may terminate. At step 1208, if the credit/debit card application 1202 approves the transaction, then, at step 1210, the method 1200 may include the credit/debit card application 1202 executed by a provider, such as a credit/debit card company, payment processor, association, financial institution (e.g., issuing bank, acquiring bank), clearinghouse, gateway, etc., transmitting data associated with the transaction to the consumer incentivizing service 102. The data may include information pertaining to the merchant (e g, name, location, type of business, etc.), information pertaining to the consumer (e.g., name, phone number, address, email address, etc.), information pertaining to the transaction (e.g., identifier of the good or service, description of the good or service, price of the good or service, etc.), etc.

The computing device 128 may determine at step 1212 whether the merchant is set up in a database 108 associated with the consumer feedback incentivizing service 102. If not, then the method 1200 may terminate. If the merchant is set up, then the method 1200 may proceed to step 1214, wherein a net promoter score (NPS) or other survey is generated and sent to the consumer's wireless device via a notification. The notification may include an SMS text message, or any other messenger application (e.g., WhatsApp®, Telegram®, Signal®, Facebook Messenger®, Snapchat®, Kik®, Skype®, etc.), notification, email message, QR code, or some combination thereof. At step 1216, the user may use their user device 128 to enter one or more responses to requests for information included in the survey. The survey may be included in the body of the text message or a link may be included in the text message and the link may redirect a web browser to a webpage that displays the survey. In some embodiments, the webpage may be associated with the payment processor (e.g., Visa®, Amex®, MasterCard®, Discover®, etc.). The webpage may display the number of points the user has accumulated by completing other surveys.

After the survey is complete, the method 1200 may proceed to step 1218 wherein the consumer feedback incentivizing service 102 may determine whether one or more trigger events have been met. The trigger events may pertain to social media activity, SMS activity (e.g., any other messenger application (e.g., WhatsApp®, Telegram®, Signal®, Facebook Messenger®, Snapchat®, Kik®, Skype®, etc.)), QR code activity, email activity, survey activity, or the like. For example, the trigger event related to the survey activity may be satisfied when one or more new questions are answered. If the one or more trigger events are satisfied, the method 1200 may proceed to step 1220 wherein the computing device 104 generates a new incentive offer and/or interrogatory and sends one or more of them to the user's wireless device (user device 128) via a notification. The notification may include an SMS text message (e.g., or any other messenger application (e.g., WhatsApp®, Telegram®, Signal®, Facebook Messenger®, Snapchat®, Kik®, Skype®, etc.), notification, email message, QR code, or some combination thereof. At step 1222, if there is a new interrogatory, the user may complete the interrogatory via SMS text message, email, or both and the method 1200 may return to the step 1218. Further, the incentive offer may be deposited into a digital wallet associated with the user. As described herein, in some embodiments, the digital wallet may be executable by the computing device 104 in a cloud-based computing system (e.g., cloud or IoT computing system or any combination thereof) and the incentive offer may be stored in the digital wallet for the user in the cloud-based computing system.

If the one or more trigger events are not satisfied, the method 1200 may proceed to step 1224 where the computing device 104 adds the user to a merchant loyalty program and sends a notification to management personnel of the merchant. At step 1226, the computing device 104 may generate and/or provide a Quick Response (QR) code or link to the user in a notification (e.g., SMS text message, email, etc.). The QR code or link may be associated with an incentive offer. At step 1228, the database 108 may be made available for automatic (e.g., timed) offers or direct marketing (e.g., attribute-based marketing) to consumers using artificial intelligence, as described further herein. For example, an artificial intelligence engine may generate one or more machine learning models trained to perform enhanced marketing techniques disclosed herein.

Figure 13:
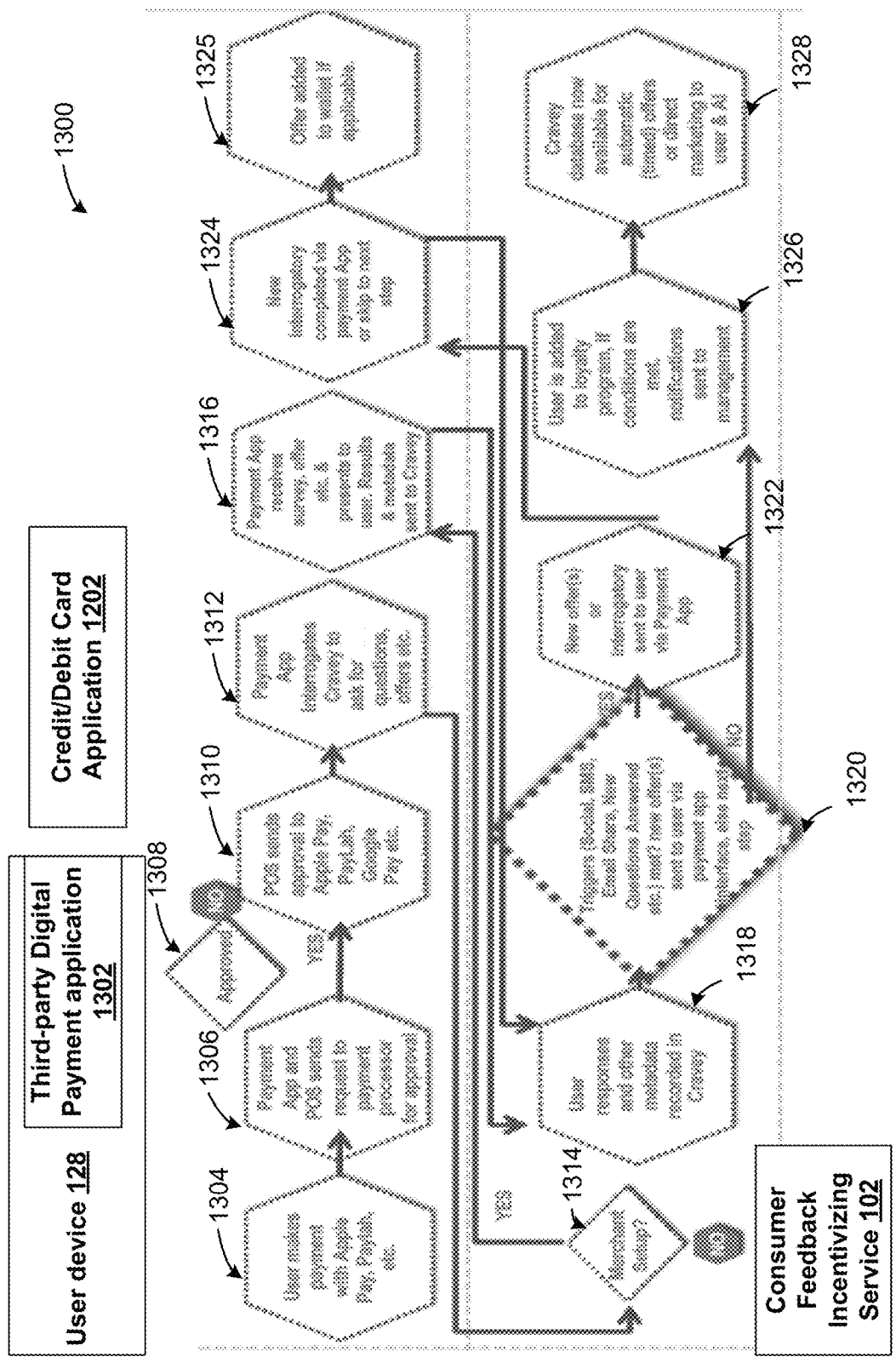
FIG. 13 represents a flowchart of a method for a third-party payment application installed on a consumer's wireless device, according to various embodiments of this disclosure.

FIG. 13 represents a flowchart of a method 1300 for a third-party digital payment application 1302 (e.g., Apple Pay®, Venmo®, Google Pay®, DBS PayLah!®, etc.) installed on a consumer's wireless device (user device 128), according to various embodiments of this disclosure.

One or more of the steps in the method 1300 may be performed by the third-party digital payment application 1302, a credit/debit card application 1202, the user device 128, and/or the computing device 104 of the consumer feedback incentivizing system 102. The credit/debit card application 1202 may be installed on a computing device (e.g., server) associated with a provider of the credit/debit card application 1202 (e.g., credit/debit card company such as Visa® Amex®, MasterCard®, Discover®, financial institution such as a bank (Bank of America®)) or may be installed at the computing device 104.

At step 1304, the method 1200 may include a user making a payment via the third-party digital payment application 1302. The payment may be associated with a transaction the user makes via a website, via another application, via the third-party digital payment application 1302, via a point-of-sale system, or the like. The transaction may represent a trigger event and the user may enter an identifier when making the transaction. The identifier may include a phone number, for example. The transaction may involve the user purchasing a good or service.

At step 1306, to approve the transaction, the method 1300 may include the third-party digital payment application 1302 and/or point-of-sale system transmitting a request to the credit/debit card application 1202. At step 1308, if the credit/debit card application 1202 declines the transaction, the method 1300 may terminate. At step 1308, if the credit/debit card application 1202 approves the transaction, then, at step 1310, the method 1200 may include the credit/debit card application 1202 transmitting an approval to the point-of-sale system, and the point-of-sale system may transmit the approval to the third-party digital payment application 1302. At step 1312, the third-party digital payment application 1302 may interrogate the consumer feedback incentivizing service 102 for Net Promoter Score (NPS) or similar requests for information in a survey, for one or more incentive offers, etc.

At step 1314, the computing device 128 may determine whether the merchant has been set up in a database 108 associated with the consumer feedback incentivizing service 102. If not, then the method 1300 may terminate. If the merchant has been set up, then the method 1300 may proceed to step 1316, wherein the third-party digital payment application 1302 receives a survey and information related to an incentive offer, and then presents the same. The third-party digital payment application 1302 may receive one or more responses to the requests for information included in the survey and transmit the responses and/or metadata to the consumer feedback incentivizing service 102.

At step 1318, the computing device 104 may receive the Net Promoter Score (NPS) or similar responses to the survey and other metadata and record them in the database 108. For example, if the user completed the survey, then the incentive offer may be stored in a digital wallet associated with the consumer. In some embodiments, the digital wallet may be executed at, managed by, and/or maintained by a cloud-based computing system (e.g., cloud or IoT computing system or any combination thereof), the third-party digital payment application 1302, the credit/debit card application 1202, the computing device 104, or the computing device 128. At step 1320, the consumer feedback incentivizing service 102 may determine whether one or more trigger events had been met. The trigger events may pertain to social media activity, SMS activity (e.g., or any other messenger application (e.g., WhatsApp®, Telegram®, Signal®, Facebook Messenger®, Snapchat®, Kik®, Skype®, etc.)), email activity, QR code activity, survey activity, or the like. For example, the trigger event related to the survey activity may be satisfied when one or more new questions are answered. If the one or more trigger events are satisfied, the method 1300 may proceed to step 1322 where the computing device 104 generates a new incentive offer and/or interrogatory and sends them to the third-party digital payment application 1302 executing on the wireless device of the consumer. At step 1324, if there is a new interrogatory, the user may complete the new interrogatory via the third-party digital payment application 1302 and the method 1300 may return to the step 1318. Further, at step 1325, the new incentive offer may be deposited into a digital wallet associated with the user.

If the one or more trigger events are not satisfied, the method 1300 may proceed to step 1326 where the computing device 104 adds the user to a merchant loyalty program and sends a notification to management of the merchant. At step 1328, the database 108 may be made available for automatic (e.g., timed) offers or direct marketing (e.g., attribute-based marketing) to consumers using artificial intelligence, as described further herein. For example, an artificial intelligence engine may generate one or more machine learning models trained to perform enhanced marketing techniques disclosed herein.

Figure 14:
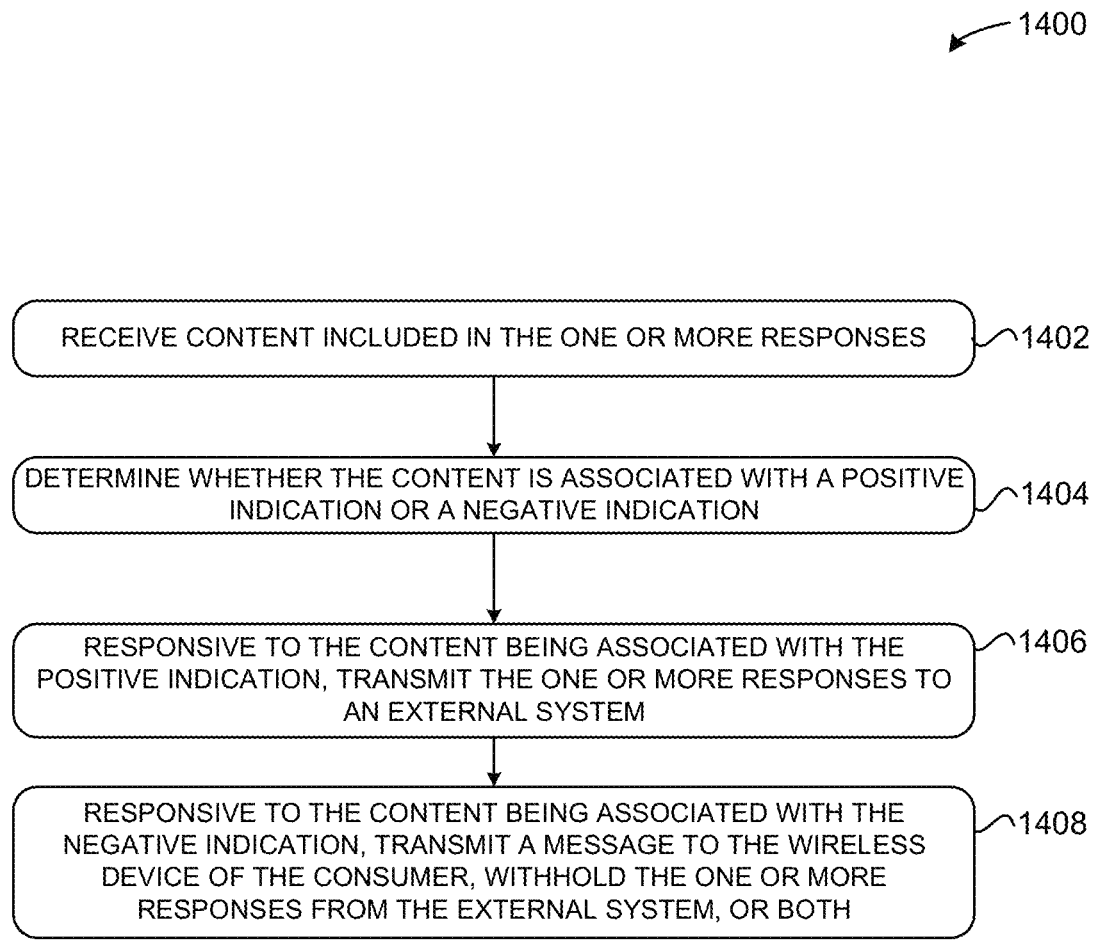
FIG. 14 represents a flowchart of a method for managing responses based on their content, according to various embodiments of this disclosure.

FIG. 14 represents a flowchart of a method 1400 for managing responses based on their content, according to various embodiments of this disclosure. The method 1400 may be performed by processing logic that may include hardware (circuitry, dedicated logic, etc.), firmware, software, web services (e.g., a software system configured to support machine to machine interaction over a network), application programming interfaces (APIs) (e.g., a software interface that offers services to other software), or a combination of them. The method 1400 and/or each of their individual functions, subroutines, methods (e.g., object-oriented programming) or operations may be performed by one or more processing devices (e.g., any component of the system 100 of FIG. 1) implementing the method 1400. The method 1400 may be performed in a similar manner as the method 1100.

At step 1402, the processing device may receive content included in the one or more responses to the survey presented on the wireless device of the consumer. The processing device may analyze the content. The content may include text, alphanumeric characters, audio, video, any multimedia, or the like. In some embodiments, the content may include one or more ratings of a consumer satisfaction level, a merchant satisfaction level, or the like.

At step 1404, based on the analysis, the processing device may determine whether the content is associated with a positive indication or a negative indication. The processing device may use natural language processing, object character recognition, speech analysis, sentiment analysis, or some combination thereof to process text associated with the content of the responses. In some embodiments, a machine learning model may be trained to use natural language processing to process the content and determine the indication of the content. For example, a corpus of training data be used to train the machine learning model to determine the indication of the content. The corpus of training data may include text (e.g., words combined in sentences and paragraphs) and labels that identify the text as having a positive or negative indication. The machine learning model may match patterns between received text and the training data text to determine whether the indication is positive or negative.

At step 1406, responsive to the content being associated with the positive indication, the processing device may transmit the one or more responses to an external system (e.g., a website that hosts reviews from members of the website). At step 1408, responsive to the content being associated with the negative indication, the processing device may transmit a message to the wireless device of the consumer, withhold the one or more responses from the external system, or both. For example, the message may include an inquiry regarding why the consumer provided a negative response. Further, the message may include an incentive offer for the consumer to attempt to change the consumer's mind and provide an updated positive response.

Figure 15:
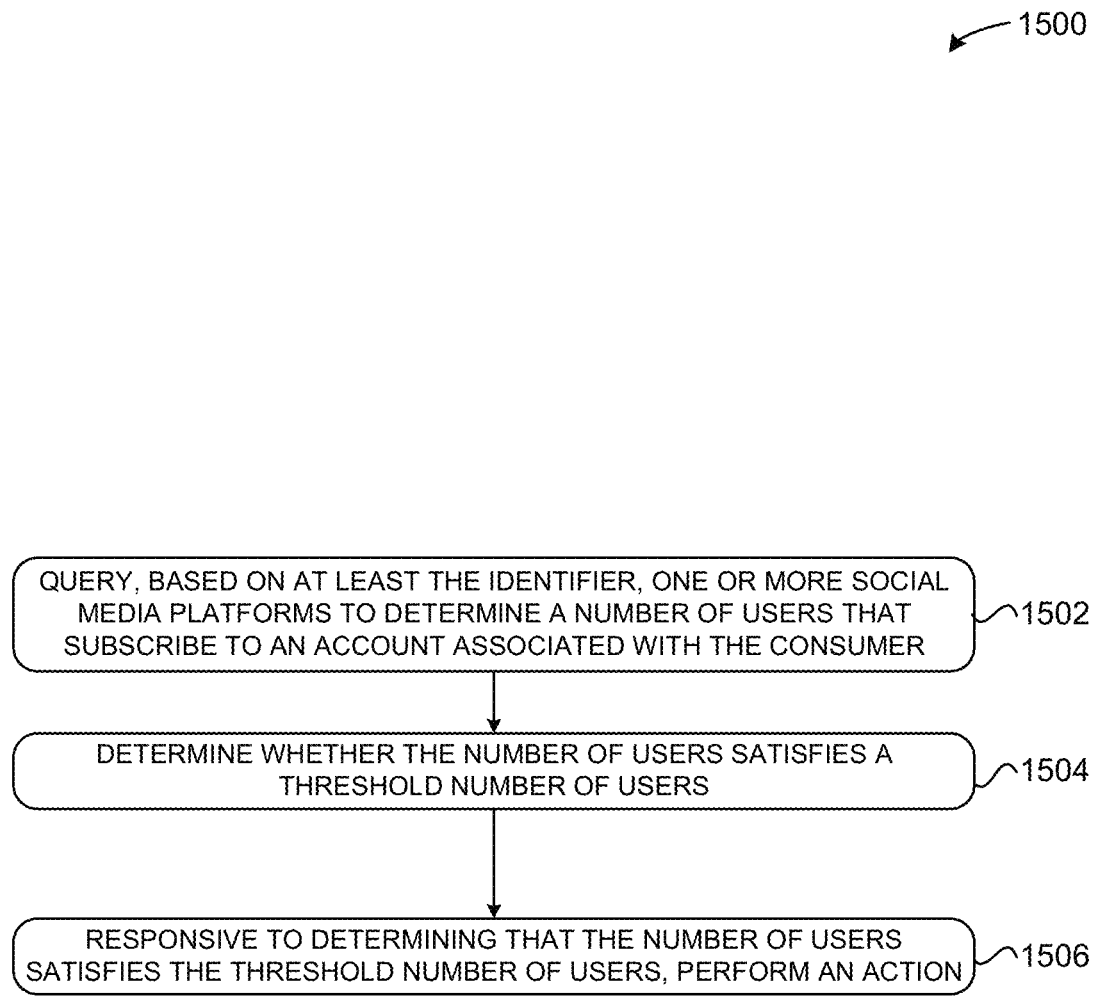
FIG. 15 represents a flowchart of a method for determining, based on an identifier, whether a consumer is a social influencer and performing an action, according to various embodiments of this disclosure.

FIG. 15 represents a flowchart of a method 1500 for determining, based on an identifier, whether a consumer is a social influencer and performing an action, according to various embodiments of this disclosure. The method 1500 may be performed by processing logic that may include hardware (circuitry, dedicated logic, etc.), firmware, software, web services (e.g., a software system configured to support machine to machine interaction over a network), application programming interfaces (APIs) (e.g., a software interface that offers services to other software), or a combination of them. The method 1500 and/or each of their individual functions, subroutines, methods (e.g., object-oriented programming), or operations may be performed by one or more processing devices (e.g., any component of the system 100 of FIG. 1) implementing the method 1500. The method 1500 may be performed in a similar manner as the method 1100.

At 1502, the processing device may query, based on at least the identifier, one or more social media platforms to determine a number of users that subscribe to an account associated with the consumer. In some embodiments, "subscribing" may refer to a user's account "following" an account of the consumer, the user's account "liking" the account of the consumer, the user's account belonging to a group associated with the account of the consumer, and so forth. Subscribing to the consumer's account may indicate that the user desires to receive updates (e.g., when the consumer makes a social media post, when the consumer likes certain content on the social media platform, and so forth) pertaining to the consumer's account.

At step 1504, the processing device may determine whether the number of users satisfies a threshold number of users. The threshold number of users may be any suitable number, such as in the tens, hundreds, thousands, hundred thousands, millions, etc. The threshold number of users may be configured by one or more merchants. The threshold number of users subscribing to a consumer's account may provide an indication that the consumer is a "social influencer." A social influencer may refer to a consumer that has a certain number of users subscribing to their account because the consumer's actions on that social media platform may be shown to the subscribers and may influence the subscribers future actions or decisions.

At step 1506, responsive to determining that the number of users satisfies the threshold number of users, the processing device may perform an action. When the number of users satisfies the threshold number of users, the consumer may be referred to as a social influencer consumer. The action may pertain to a marketing action, such as transmitting an incentive offer to the computing device associated with the social influencer consumer or depositing the incentive offer directly in a digital wallet associated with the consumer. The action may include transmitting a notification to an account of the social influencer consumer associated with the social media platform and/or to the computing device associated with the social influencer consumer.

Figure 16:
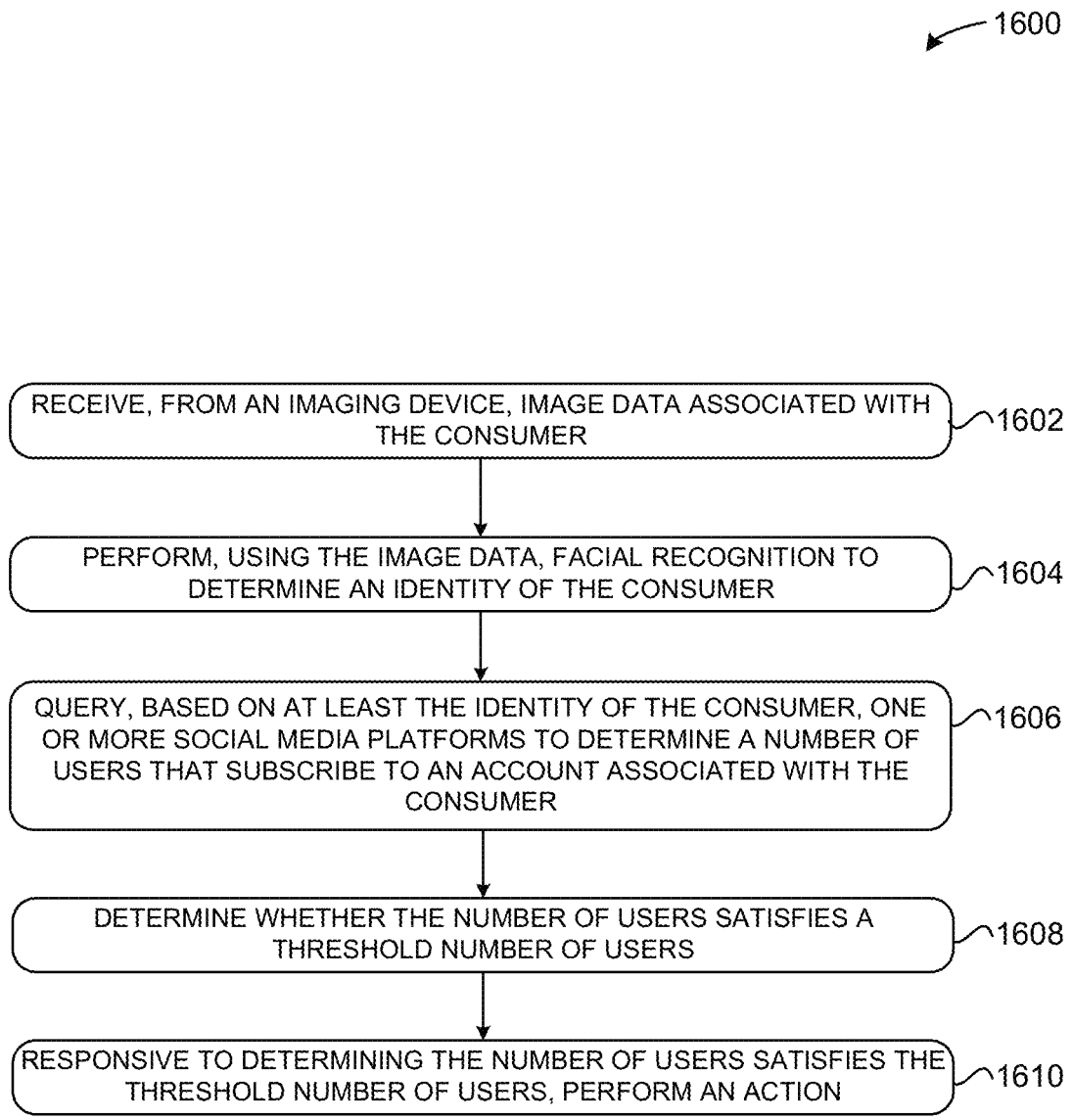
FIG. 16 represents a flowchart of a method for determining, using facial recognition, whether a consumer is a social influencer and performing an action, according to various embodiments of this disclosure.

FIG. 16 represents a flowchart of a method 1600 for determining, using facial recognition, whether a consumer is a social influencer and performing an action, according to various embodiments of this disclosure. The method 1600 may be performed by processing logic that may include hardware (circuitry, dedicated logic, etc.), firmware, software, web services (e.g., a software system configured to support machine to machine interaction over a network), application programming interfaces (APIs) (e.g., a software interface that offers services to other software), or a combination of them. The method 1600 and/or each of their individual functions, subroutines, methods (e.g., object-oriented programming), or operations may be performed by one or more processing devices (e.g., any component of the system 100 of FIG. 1) implementing the method 1600. The method 1600 may be performed in a similar manner as the method 1100.

At step 1602, the processing device may receive, from an imaging device, image data associated with the consumer. The imaging device may include a camera and the imaging data may include images, video, or both. For example, the imaging device may be a surveillance camera installed in a store and the image data of the consumer may be obtained when the consumer enters the store.

At step 1604, the processing device may perform, using the image data, facial recognition to determine an identity of the consumer. In some embodiments, additional biometrics may be used to determine the identity of the consumer. For example, a fingerprint may be obtained and used to determine the identity of the consumer. In some embodiments, a retinal scan may be used to determine the identity of the consumer. In some embodiments, blood or DNA may be used to determine the identity of the consumer.

At step 1606, the processing device may query, based on at least the identity of the consumer, one or more social media platforms to determine the number of users that subscribe to an account associated with the consumer. In some embodiments, the processing device may be communicatively coupled to one or more application programming interfaces (APIs) exposed by the social media platforms, and/or a database associated with the social media platforms. The APIs and/or database may provide function calls, method calls (e.g., object-oriented programming), and/or service calls that enable querying the social media platforms for a quantity of users that subscribe to the account associated with the consumer.

At step 1608, the processing device may determine whether the number of users satisfies a threshold number of users. At step 1610, responsive to determining the quantity of users satisfies the threshold number of users, the processing device may perform an action. The action may include a marketing action directed at motivating the social influencer consumer to promote the merchant associated with the transaction the social influencer consumer made, intends to make, or is about to make. In some embodiments, if the social influencer consumer has been identified prior to making a transaction, the action may include transmitting a notification to one or more computing devices associated with employees of the merchant at which the social influencer consumer is shopping. The notification may provide an identity of the social influencer consumer and an instruction to greet the social influencer consumer, such that the social influencer consumer may be offered an item (e.g., food or beverage), increased level of customer service, increased attention to detail, or the like.

Figure 17:
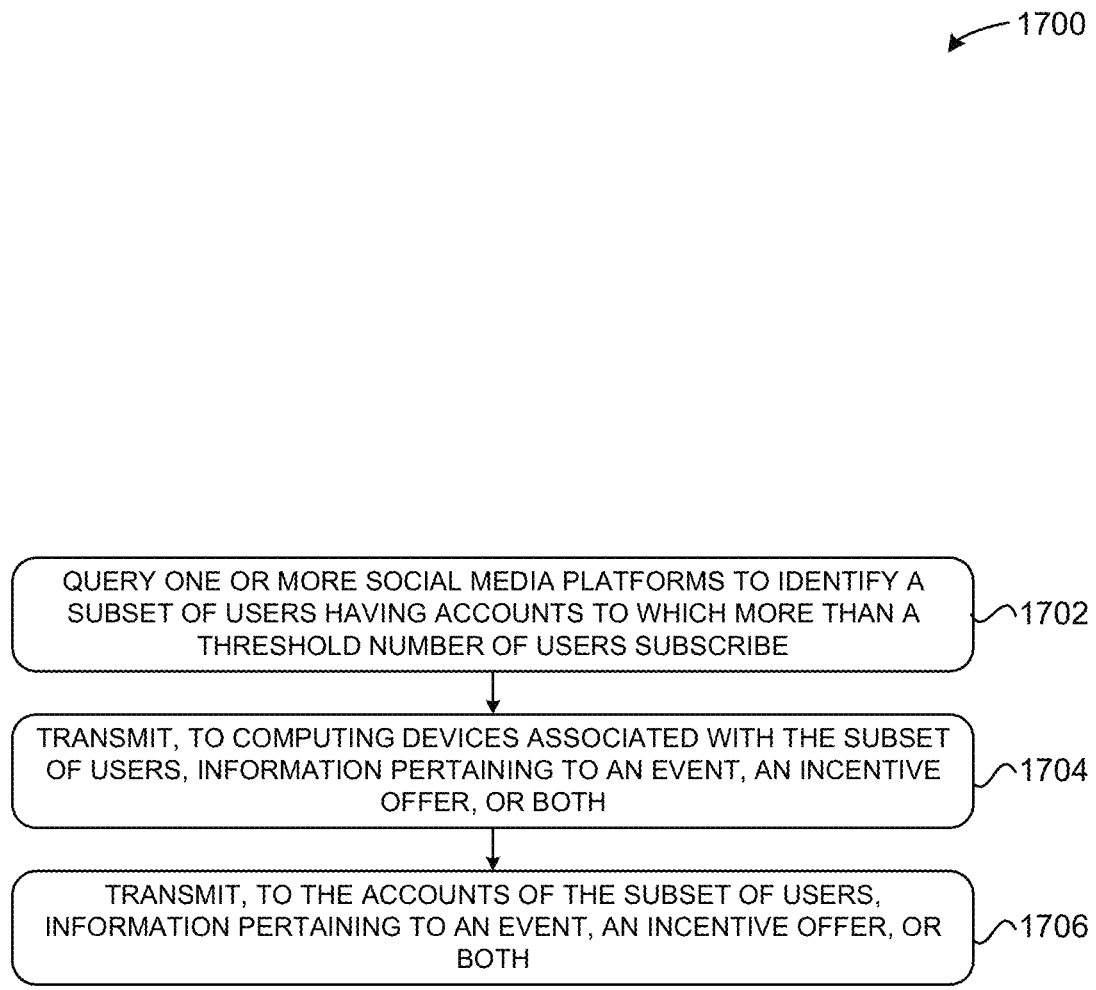
FIG. 17 represents a flowchart of a method for identifying social influencers and performing a marketing action, according to various embodiments of this disclosure.

FIG. 17 represents a flowchart of a method 1700 for identifying social influencers and performing a marketing action, according to various embodiments of this disclosure. The method 1700 may be performed by processing logic that may include hardware (circuitry, dedicated logic, etc.), firmware, software, web services (e.g., a software system configured to support machine to machine interaction over a network), application programming interfaces (APIs) (e.g., a software interface that offers services to other software), or a combination of them. The method 1700 and/or each of their individual functions, subroutines, methods (e.g., object-oriented programming), or operations may be performed by one or more processing devices (e.g., any component of the system 100 of FIG. 1) implementing the method 1700. The method 1700 may be performed in a similar manner as the method 1100.

At step 1702, the processing device may query one or more social media platforms to identify a subset of users having accounts to which more than a threshold number of users subscribe. In some embodiments, the processing device may determine how many second-level subscribers or "friends" or followers are associated with the users' accounts. Second-level subscribers or friends may refer to users who subscribe to the users subscribing to the consumer's account. In some embodiments, first-level subscribers may refer to users who directly subscribe to the consumer's account. In some embodiments, when determining whether the threshold number of users who subscribe, the processing device may count the first-level subscribers only, the second-level subscribers only, or a combination of both the first-level and second-level subscribers. In some embodiments, the first-level subscribers and/or the second-level subscribers may be members of a group with which the account of the consumer is also a member.

At step 1704, the processing device may transmit, to computing devices associated with the subset of users, information pertaining to an event, an incentive offer, or both. Such a technique may enable the merchant to leverage a social media influencer's followers to expand brand awareness and provide free advertising if the social media influencer posts about the incentive offer, the event, and/or the merchant in general.

At step 1706, the processing device may transmit, to the account of the subset of users, information pertaining to an event, an incentive offer, or both. Such a technique may enable the merchant to leverage a social media influencer's followers to expand brand awareness and provide free advertising if the social media influencer posts about the incentive offer, the event, and/or the merchant in general.

Figure 18:
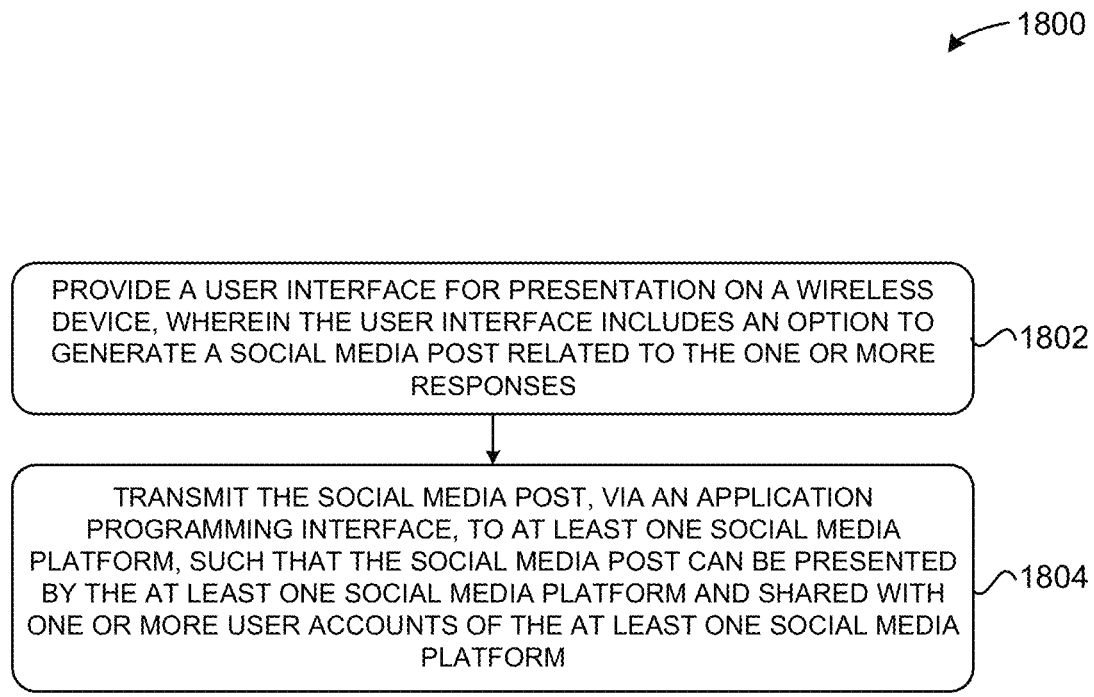
FIG. 18 represents a flowchart of a method for providing a user interface including an option to generate a social media post related to responses to a survey, according to various embodiments of this disclosure.

FIG. 18 represents a flowchart of a method 1800 for providing a user interface including an option to generate a social media post related to responses to a survey, according to various embodiments of this disclosure. The method 1800 may be performed by processing logic that may include hardware (circuitry, dedicated logic, etc.), firmware, software, web services (e.g., a software system configured to support machine to machine interaction over a network), application programming interfaces (APIs) (e.g., a software interface that offers services to other software), or a combination of them. The method 1800 and/or each of their individual functions, subroutines, method (e.g., object-oriented programming), or operations may be performed by one or more processing devices (e.g., any component of the system 100 of FIG. 1) implementing the method 1800. The method 1800 may be performed in a similar manner as the method 1100.

At step 1802, the processing device may provide a user interface for presentation on the wireless device. The user interface may include an option to generate a social media post related to the one or more responses. At step 1804, the processing device may transmit, via an application programming interface, the social media post to at least one social media platform to be presented by the at least one social media platform and, additionally or alternatively, shared with one or more user accounts of the at least one social media platform, as further depicted in FIG. 7.

Figure 19:
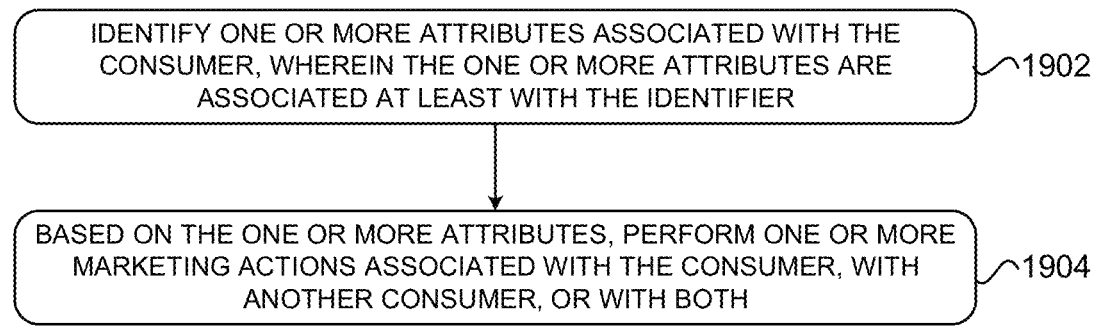
FIG. 19 represents a flowchart of a method for performing automated merchant marketing based on one or more attributes of a consumer, according to various embodiments of this disclosure.

FIG. 19 represents a flowchart of a method 1900 for performing automated merchant marketing based on one or more attributes of a consumer, according to various embodiments of this disclosure. The method 1900 may be performed by processing logic that may include hardware (circuitry, dedicated logic, etc.), firmware, software, web services (e.g., a software system configured to support machine to machine interaction over a network), application programming interfaces (APIs) (e.g., a software interface that offers services to other software), or a combination of them. The method 1900 and/or each of their individual functions, subroutines, methods (e.g., object-oriented programming), or operations may be performed by one or more processing devices (e.g., any component of the system 100 of FIG. 1) implementing the method 1900. The method 2000 may be performed in a similar manner as the method 1100.

At step 1902, the processing device may identify one or more attributes associated with the consumer. The one or more attributes may be associated with the identifier (e.g., phone number associated with the consumer, email, address, driver's license number, social security number, QR code, biometric data, etc.).

At 1904, based on the one or more attributes associated with the consumer, the processing device may perform one or more marketing actions associated with the consumer, another consumer, or both. The attribute may indicate that the consumer purchases good X, and similar consumers to the consumer also purchase good Y when the similar consumers purchase good X. Accordingly, the marketing action may include the transmission of a recommendation to the wireless device of the consumer to purchase good Y. The attribute may indicate a particular characteristic of the consumer (e.g., age) and location of the consumer. The processing device may determine that consumers that have similar characteristics purchase certain goods and/or services. Accordingly, the marketing action may include transmitting a recommendation to the wireless device of the consumer to purchase those certain goods and/or services. In some embodiments, the marketing action may include selecting, based on the attributes of the consumer, one or more incentive offers to recommend to the consumer via the wireless device and/or to deposit directly into the digital wallet associated with the consumer.

In some embodiments, the processing device may determine that a current time is later than an expiration time. The expiration time may relate to an elapsed time since the trigger event occurred, since the incentive offer is stored and/or deposited in the digital wallet, or the like. The expiration time may be a predefined amount of time from an initial event (e.g., trigger event occurring, incentive offer being deposited in the digital wallet, etc.). For example, the expiration time may be predefined as minutes, hours, days, weeks, months, years, etc. The expiration time may also be a specific date and time. The expiration time may be configured by the merchants using a computing device.

In some embodiments, based on the current time being later than the expiration time, the processing device may transmit the incentive offer for display on the wireless device (e.g., user device 128). Transmitting the incentive offer for display on the wireless device may encourage the consumer to visit the merchant (either virtually online via a website or application, or in person at a physical location) to execute another transaction with the merchant and to use the incentive offer.

In some embodiments, the transaction may be associated with a first good or service and the processing device may be configured to determine that a second good or service is associated with the first good or service. For example, transaction history data may indicate consumers that purchase the first good or service tend to purchase the second good or service a certain percentage of the time. Accordingly, the processing device may transmit, for display on the wireless device of the consumer, a recommendation to purchase the second good or service. In some embodiments, one or more machine learning models may be trained, based on the transaction history data, to determine the second good or service is associated with the first good or service and to recommend the second good or service to the consumer. In some embodiments, the recommendation to purchase the second good or service may include a discount to purchase the second good or service. The discount may be predefined or may dynamically determined based on demand for the second good or service, or on a likelihood the consumer will purchase the second good or service based on the user's transaction history, etc.

In some embodiments, the processing device may generate, via an artificial intelligence engine, one or more machine learning models trained to receive input comprising one or more attributes associated with one or more consumers and to output one or more marketing recommendations for the one or more consumers. The artificial intelligence engine may use the training engine to train the machine learning model based on a corpus of training data related to one or more attributes of consumers mapped to marketing recommendations (e.g., certain attributes of the consumers are associated with the consumers purchasing certain goods or services, consumer spending habits indicate the consumer spends money at certain times of day, at events, at special occasions, etc., incentive preference data indicates certain incentives cause the consumer to complete transactions, etc.). The marketing recommendations may include information about one or more incentive offers, events, or both to transmit to the consumers' wireless devices (e.g., user device 128). Such attribute-based marketing may enable more efficient marketing that may lead to an increased transaction completion rate. In some embodiments, the processing device may transmit the one or more marketing recommendations for the one or more consumers to one or more computing devices associated with one or more merchants.

In some embodiments, the processing device may generate, via an artificial intelligence engine, one or more machine learning models trained to receive input comprising a plurality of responses to a plurality of surveys and to output one or more marketing recommendations for the one or more consumers. The artificial intelligence engine may use the training engine to train the machine learning model based on a corpus of training data related to responses to surveys mapped to marketing recommendations (e.g., certain responses to surveys are associated with consumers returning to make subsequent transactions, accordingly transmitting additional incentive offers to the consumers may lead to higher transaction completion rates). To transmit to the consumers' wireless devices (e.g., user device 128), the marketing recommendations may include information about one or more incentive offers, events, or both. In some embodiments, the processing device may transmit the one or more marketing recommendations for the one or more consumers to one or more computing devices associated with one or more merchants.

In some embodiments, the machine learning models may be trained to provide insights to merchants and the insights may be presented in one or more dashboards disclosed herein. For example, the insights may indicate that a score for the merchant is above or below a mean score for a particular time period (e.g., Monday mornings), a particular location, a particular good or service provided, a particular demographic, a particular customer service, or any combination of one or more thereof. The insights may indicate a competitor merchant's scores are rising or declining over a certain time period (e.g., past month). Additionally or alternatively, the insights may indicate that a certain number (e.g., 5) of new merchants associated with the same class of business as a particular merchant have opened within a certain radius (e.g., 5 miles) of the particular merchant's location in the past month. The insights may indicate a certain incentive offer (e.g., free muffin) is associated with higher success rates (e.g., drives 23% more return customer visits and 45% more net new customers visits than a free extra espresso shot) than other incentive offers.

In some embodiments, the processing device may perform automatic screen "scraping" techniques by web crawling web sites associated with social media platforms. The processing device may identify a user's social influence by determining a frequency of social media posts made by the user and determining a number of followers associated with the account of the user. Based on the frequency and the number of followers, the processing device may determine a social power score. A social power score may be associated with each user of the social media platform. The one or more social power scores may be provided to one or more merchants to enable the one or more merchants to perform one or more actions.

For example, the processing device may determine that Jane has 10,000 Facebook® followers and Jane posts twice per day on average. The processing device may also determine that Jane has 5,000 Twitter® followers and Jane posts once per day on average. Accordingly, Jane's social power score may be 15,000 (e.g., (10,000×2)+(5,000×1)=25,000. The processing device may determine that Ralph has 10 Facebook® followers and posts once per month on average. Ralph's social power score may be 3 (e.g., (1/30)×10). Accordingly, a machine learning model may be trained based on training data provided by a merchant to perform one or more actions. The one or more actions may include transmitting a notification to a staff member of the merchant regarding Jane's being a social influencer so that Jane may receive enhanced customer service or an offer (e.g., "would you like to try this muffin on the house?"), whereas Ralph may not receive any special treatment.

In some embodiments, the processing device may determine which customer's in the database 129 have a social influence and/or a social power score above a threshold. Based on the social influence and/or the social power score being above the threshold, the processing device may generate one or more marketing campaigns and/or events to target those users to recommend the merchant's products and/or services. Such marketing campaigns and/or events may include providing incentive offers to the influencers in an attempt to encourage the influencers to promote the merchant's products and/or services.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A system comprising:
one or more hardware processors configured by machine-readable instructions to:
receive information pertaining to a trigger event, wherein the trigger event relates to a transaction associated with a consumer and the transaction comprises an identifier associated with the consumer;
based on the trigger event:
generate a survey comprising one or more requests for information related to the transaction,
select, by the one or more hardware processors, an incentive offer from an incentive offer database,
transmit, for display on a wireless device of the consumer, a notification to the wireless device, wherein the notification is associated with the survey and information pertaining to the incentive offer;
receive one or more responses to the survey;
responsive to receiving the one or more responses to the survey, automatically store, by the one or more hardware processors, the incentive offer in a digital wallet associated with the identifier; and
display, in a user interface for the digital wallet, the incentive reward that is deposited in the digital wallet.

2. The system of claim 1, wherein the transaction is initiated using a credit card or a debit card.

3. The system of claim 1, wherein the transaction is initiated at the wireless device of the consumer.

4. The system of claim 1, wherein the digital wallet is configured to be executable on a computing device of a third-party entity, and the computing device is configured to process the transaction.

5. The system of claim 4, wherein the third-party entity comprises a payment processor, a clearinghouse, association, gateway, or a financial institution.

6. The system of claim 4, wherein the computing device of the third-party entity is configured to synchronize information between the digital wallet and a second digital wallet executing on the wireless device, wherein the information is associated with the consumer, and the information comprises the identifier and the incentive offer.

7. The system of claim 1, wherein the digital wallet is configured to be executable on the wireless device of the consumer.

8. The system of claim 1, wherein the notification comprises one or more of a text message or an email, and the identifier comprises (i) a phone number, (ii) a name, (iii) a passport identifier, (iv) a physical address, (v) an email address, a birthdate, (vi) a biometric identifier such as facial recognition, a fingerprint, or a retinal scan, (vii) a driver's license number, (viii) a social security number, (ix) a user identification number, (x) a government-issued identity card number, (xi) social media username, (xii) social media avatar, or some combination thereof.

9. The system of claim 1, wherein the one or more hardware processors are configured to:
receive content included in the one or more responses;
determine whether the content is associated with a positive indication or a negative indication;
responsive to the content being associated with the positive indication, transmitting the one or more responses to an external system; and
responsive to the content being associated with the negative indication, transmitting a message to the wireless device of the consumer, withholding the one or more responses from the external system, or both.

10. The system of claim 1, wherein the one or more hardware processors are configured to:
query, based on at least the identifier, one or more social media platforms to determine a number of users that subscribe to an account associated with the consumer;
determine whether the number of users satisfies a threshold number of users;
responsive to determining that the number of users satisfies the threshold number of users, perform an action.

11. The system of claim 1, wherein the one or more hardware processors are configured to:
receive, from an imaging device, image data associated with the consumer;
perform, using the image data, facial recognition to determine an identity of the consumer;
query, based on at least the identity of the consumer, one or more social media platforms to determine a number of users that subscribe to an account associated with the consumer;
determine whether the number of users satisfies a threshold number of users;
responsive to determining the number of users satisfies the threshold number of users, perform an action.

12. The system of claim 1, wherein the one or more hardware processors are configured to:

query one or more social media platforms to identify a subset of users having accounts to which more than a threshold number of users subscribes; and transmit, to computing device associated with the subset of users, information pertaining to an event, an incentive offer, or both.

13. The system of claim 1, wherein the one or more hardware processors are configured to:

query one or more social media platforms to identify a subset of users having accounts to which more than a threshold number of users subscribes; and transmit, to the accounts of the subset of users, information pertaining to an event, an incentive offer, or both.

14. The system of claim 1, wherein the one or more hardware processors are configured to:

determine that a current time is later than an expiration time; and based on the current time being later than the expiration time, transmit the incentive offer for display on the wireless device.

15. The system of claim 1, wherein the transaction is associated with a first good or service, and the one or more hardware processors are configured to:

determine that a second good or service is associated with the first good or service; and transmit, for display on the wireless device of the consumer, a recommendation to purchase the second good or service.

16. The system of claim 15, wherein the recommendation comprises a discount to purchase the second good or service.

17. The system of claim 1, wherein the one or more hardware processors are configured to:

identify one or more attributes associated with the consumer, wherein the one or more attributes are associated at least with the identifier; and based on the one or more attributes, perform one or more marketing actions associated with the consumer, with another consumer, or with both.

18. The system of claim 1, wherein the one or more hardware processors are configured to:

generate, via an artificial intelligence engine, one or more machine learning models trained to receive input comprising one or more attributes of one or more consumers and to output one or more marketing recommendations for the one or more consumers; and transmit the one or more marketing recommendations for the one or more consumers to one or more computing devices associated with one or more merchants.

19. The system of claim 1, wherein the one or more hardware processors are configured to:

generate, via an artificial intelligence engine, one or more machine learning models trained to receive input comprising a plurality of responses to a plurality of surveys and to output one or more marketing recommendations for the one or more consumers; and transmit the one or more marketing recommendations for the one or more consumers to one or more computing devices associated with one or more merchants.

20. The system of claim 1, wherein:

the one or more responses to the survey are entered via a user interface of a standalone application installed on the wireless device, or the one or more responses to the survey are entered via a website executing in a web browser installed on the wireless device.

21. The system of claim 1, wherein the one or more hardware processors are configured to:

provide a user interface for presentation on the wireless device, wherein the user interface includes an option to generate a social media post related to the one or more responses; and transmit the social media post, via an application programming interface, to at least one social media platform, such that the social media post can be presented by the at least one social media platform and shared with one or more user accounts of the at least one social media platform.

22. The system of claim 1, wherein the one or more hardware processors are configured to determine, based on the information, the trigger event occurred.

23. The system of claim 1, wherein the one or more hardware processors are configured to execute the digital wallet and the system further comprises one or more memory devices storing computer instructions implementing the digital wallet, information associated with the digital wallet, or both.

24. The system of claim 1, wherein the one or more hardware processors are configured to:

determine a frequency of social media posts made by the consumer;

determine a number of followers associated with the account of the consumer;

based on the frequency and the number of followers, determine a social power score; and provide the social power score to one or more merchants to enable the one or more merchants to perform one or more actions.

25. A method of operating a wireless device, the method comprising:

receive information pertaining to a trigger event, wherein the trigger event relates to a transaction associated with a consumer and the transaction comprises an identifier associated with the consumer;

based on the trigger event:

generating a survey comprising one or more requests for information related to the transaction, selecting, by one or more processors, an incentive offer from an incentive offer database, transmitting, for display on a wireless device of the consumer, a notification to the wireless device, wherein the notification is associated with the survey and information pertaining to the incentive offer;

receiving one or more responses to the survey;

responsive to receiving the one or more responses to the survey, automatically storing, by the one or more processors, the incentive offer in a digital wallet associated with the identifier; and displaying, in a user interface for the digital wallet, the incentive reward that is deposited in the digital wallet.

26. A non-transient computer-readable storage medium having instructions embodied thereon, the instructions being executable by one or more processors to perform a method for operating a wireless device, the method comprising:

receive information pertaining to a trigger event, wherein the trigger event relates to a transaction associated with a consumer and the transaction comprises an identifier associated with the consumer;

based on the trigger event:

generating a survey comprising one or more requests for information related to the transaction, selecting, by one or more processors, an incentive offer from an incentive offer database, transmitting, for display on a wireless device of the consumer, a notification to the wireless device, wherein the notification is associated with the survey and information pertaining to the incentive offer;

receiving one or more responses to the survey;

responsive to receiving the one or more responses to the survey, automatically storing, by the one or more processors, the incentive offer in a digital wallet associated with the identifier; and displaying, in a user interface for the digital wallet, the incentive reward that is deposited in the digital wallet.

\* \* \* \* \*